United States Patent
Jöngren et al.

(10) Patent No.: US 8,494,033 B2
(45) Date of Patent: Jul. 23, 2013

(54) METHODS PROVIDING PRECODER FEEDBACK USING MULTIPLE PRECODER INDICES AND RELATED COMMUNICATIONS DEVICES AND SYSTEMS

(75) Inventors: George Jöngren, Stockholm (SE); Svante Bergman, Hägersten (SE); David Hammarwall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 303 days.

(21) Appl. No.: 12/973,096

(22) Filed: Dec. 20, 2010

(65) Prior Publication Data

US 2011/0305263 A1 Dec. 15, 2011

Related U.S. Application Data

(60) Provisional application No. 61/354,990, filed on Jun. 15, 2010.

(51) Int. Cl.
*H04L 25/49* (2006.01)

(52) U.S. Cl.
USPC .......... 375/219; 375/295; 375/316; 375/285; 375/267; 375/299; 375/260; 375/259; 375/346; 375/347; 375/349

(58) Field of Classification Search
USPC ............... 375/295, 316, 285, 267, 299, 260, 375/259, 346, 347, 349, 219
See application file for complete search history.

(56) References Cited

U.S. PATENT DOCUMENTS

| 6,859,503 | B2 * | 2/2005 | Pautler et al. ............... 375/299 |
| 2008/0316910 | A1 | 12/2008 | Ashikhmin |
| 2011/0070918 | A1 * | 3/2011 | Hafeez ........................ 455/522 |
| 2011/0110414 | A1 * | 5/2011 | Papadogiannis et al. ..... 375/227 |
| 2011/0287790 | A1 * | 11/2011 | Haustein et al. ............. 455/500 |

FOREIGN PATENT DOCUMENTS

| EP | 1 324 511 A2 | 7/2003 |
| EP | 1 919 097 A1 | 5/2008 |
| WO | WO 2008/021062 A1 | 2/2008 |
| WO | WO 2008/054737 A2 | 5/2008 |
| WO | WO 2008/147121 A1 | 12/2008 |
| WO | WO 2008/157620 A2 | 12/2008 |
| WO | WO 2009/026769 A1 | 3/2009 |

OTHER PUBLICATIONS

A limited feedback precoding system with Hierarchical Codebook and linear receiver by Yongming Huang, Daofeng Xu, Luxi Yang, and Wei-Ping Zhu, dated Dec. 12, 2008.*
Grid of Beams (GoB) Based Downlink Multi-User MIMO by Stephen Saur, IEEE C802. 16m-08/487, dated May 5, 2008.*
International Preliminary Report on Patentability Corresponding to International Application No. PCT/SE2010/051451; Date of Mailing: Sep. 26, 2012; 17 Pages.
International Search Report and Written Opinion of the International Searching Authority for International Application No. PCT/SE2010/051451; Date of Mailing: Apr. 20, 2011; 11 pages.

* cited by examiner

*Primary Examiner* — Siu Lee
(74) *Attorney, Agent, or Firm* — Myers Bigel Sibley & Sajovec, P.A.

(57) ABSTRACT

Data may be transmitted from a first communications device using multiple antennas to a second communications device based on precoder feedback defining a grid of transmission beams. A first precoder index may be received from the second communications device, and a second precoder index may be received from the second communications device. At least one symbol stream may be processed based at least in part on the first and second precoder indices to generate antenna signals for respective antenna elements of the multiple antennas, and the antenna signals may be transmitted over the multiple antennas to the communications device. Related base stations and user equipment are also discussed.

25 Claims, 8 Drawing Sheets

METHODS PROVIDING PRECODER FEEDBACK USING MULTIPLE PRECODER INDICES AND RELATED COMMUNICATIONS DEVICES AND SYSTEMS

RELATED APPLICATION

The present application claims the benefit of priority from U.S. Provisional Application No. 61/354,990 entitled "UE Precoder Selection And Designs Of Factorized Precoders With Dynamic Column Selection" filed Jun. 15, 2010, the disclosure of which is hereby incorporated herein in its entirety by reference.

TECHNICAL FIELD

The present disclosure is directed to network communications and, more particularly, to wireless communications in systems with closed loop precoder feedback.

BACKGROUND

In a typical cellular radio system, user equipment unit nodes (UEs) (also known as wireless terminals or mobile stations) communicate via a radio access network (RAN) with one or more core networks. The RAN covers a geographical area which is divided into cell areas, with each cell area being served by a RAN node, e.g., a radio base station (BS), which in some networks is also called a "NodeB" or enhanced NodeB "eNodeB." A cell area is a geographical area where radio coverage is provided by the base station equipment at a base station site. The base stations communicate through radio communication channels with UEs within range of the base stations.

Multi-antenna techniques can significantly increase data rates and/or reliability of a wireless communication system. Performance may be improved if both the transmitter and the receiver are equipped with multiple antennas, which results in a multiple-input multiple-output (MIMO) communication channel. Such systems and/or related techniques are commonly referred to as MIMO. The LTE standard is currently evolving with enhanced MIMO support and MIMO antenna deployments. LTE-Advanced, for example, may support an 8-layer spatial multiplexing mode for 8 transmit antennas with possible channel dependent precoding. The spatial multiplexing mode is provided for high data rates in favorable channel conditions.

In a downlink from a base station transmitting from an antenna array over a MIMO channel to a UE, spatial multiplexing may thus allow the simultaneous transmission of multiple symbol streams over the same frequency. Stated in other words, multiple symbol streams may be transmitted from the base station to the UE over the same time/frequency resource element (TFRE). In such a system, precoding is preformed at the base station to distribute energy of a symbol vector (including the respective symbol streams) over the array of antennas, and the precoding may be performed using one of a plurality of precoder matrices selected to match characteristics of the MIMO downlink channel between the base station and UE.

Because MIMO downlink channel characteristics vary as a function of many factors including location of the UE relative to the base station, direction/speed of movement of the UE, etc., a large number of precoder matrices may be required to appropriately match the many possible variations of the MIMO downlink channel characteristics. Moreover, MIMO downlink channel characteristics may change during a communication between the base station and UE (e.g., due to movement of the UE). Accordingly, the UE may periodically/continuously monitor downlink channel characteristics during a communication to select/reselect a precoder (from a codebook of precoders) to be used by the base station for downlink transmissions, and the UE may transmit an identification of a selected precoder as needed and/or periodically to the base station over an uplink from the UE to the base station to provide closed loop precoder selection.

Because a relatively large number of precoder matrices may be defined/included in the codebook, the precoder identifications may be relatively lengthy to allow unique identification of each precoder matrix. Frequent transmission of precoder identifications over the uplink from the UE to the base station to communicate precoder selections may thus undesirable consume communication resources (e.g., bandwidth) in the uplink. Accordingly, there continues to exist a need in the art to provide improved closed loop precoder selection and related base stations and UEs.

SUMMARY

According to some embodiments, data may be transmitted from a first communications device using multiple antennas to a second communications device based on precoder feedback defining a grid of transmission beams. More particularly, a first precoder index may be received from the second communications device, and a second precoder index may be received from the second communications device. At least one symbol stream may be processed based at least in part on the first and second precoder indices to generate antenna signals for respective antenna elements of the multiple antennas, and the antenna signals may be transmitted over the multiple antennas to the second communications device. For example, a precoder matrix may be provided responsive to the first and second precoder indices, and the at least one symbol stream may be processed using the provided precoder matrix to generate the antenna signals.

By using different precoder indices to select different factors of a precoder, signaling overhead from a receiving device may be reduced. By structuring transmit precoders and the precoder codebook(s) so that each precoder comprises a product of a first factor corresponding to slowly varying characteristics of the communications channel and a second factor corresponding to more rapidly varying characteristics of the communications channel, for example, precoder indices selecting the first factor may be transmitted relatively infrequently, and precoder indices selecting the second factor may be transmitted relatively frequently. The first and second precoder indices may thus be relatively short compared to a single index used to select an overall precoder every time a precoder change is required/desired. According to some embodiments of the present invention, a relatively short second precoder index may be sufficient to communicate a majority of all precoder changes/recommendations.

Receiving the second precoder index may include receiving an initial second precoder index, providing the precoder matrix may include providing a first precoder matrix responsive to the first precoder index and the initial second precoder index, and processing the at least one symbol stream may include processing a first portion of the at least one symbol stream using the first precoder matrix to generate respective first antenna signals, and transmitting the antenna signals may include transmitting the first antenna signals. After processing the first portion of the at least one symbol stream, a subsequent second precoder index may be received from the second communications device. A second portion of the at least one symbol stream may then be processed based at least in part on the first precoder index and the subsequent second precoder index to generate respective second antenna signals for respective antenna elements of the multiple antennas, and the second antenna signals may be transmitted over the multiple antennas. The second precoder index may thus be updated more frequently than the first precoder index, so that a complete identification of a complete precoder matrix is not required for every precoder update.

The first precoder index may include a conversion precoder index that is one of a plurality of conversion precoder indices corresponding to a respective plurality of conversion precoder matrices. The second precoder index may include a tuning precoder index that is one of a plurality of tuning precoder indices corresponding to a respective plurality of tuning precoder matrices. Processing may include processing using an overall precoder matrix including a product of a conversion precoder matrix corresponding to the received conversion precoder index and a tuning precoder matrix corresponding to the received tuning precoder index. Each of the plurality of conversion precoder matrices may correspond to a respective group of the transmission beams of the grid, and each group of the transmission beams of the grid may includes a same number of the transmission beams. Moreover, each of the plurality of conversion precoder matrices may include respective lines of elements corresponding to the transmission beams of the respective group.

According to some other embodiments, each group of transmission beams may include at least two adjacent transmission beams. Moreover, at least one group of transmission beams may include a first transmission beam at a first edge of the grid and a second transmission beam at a second edge of the grid so that the first and second transmission beams have a greatest angular separation of any of the transmission beams of the grid. In addition, a second group of transmission beams may be between and overlapping first and third groups of transmission beams so that a same number of transmission beams is shared between the first and second groups and between the second and third groups. According to some other embodiments, each group of transmission beams may include only orthogonal transmission beams.

According to some other embodiments, precoder characteristics may be selected at a first communications device for a wireless channel over which communications are received from a second communications device using multiple antennas which together with a precoder codebook defines a grid of transmission beams. Characteristics of the wireless channel over which the communications are received from the second communications device may be measured, and a first precoder index may be selected responsive to measuring the characteristics of the wireless channel. A second precoder index may be selected responsive to measuring the characteristic of the wireless channel. The selected first and second precoder indices may be transmitted to the second communications device, and signals received from the multiple antennas of the second communications device may be processed.

By providing relatively short first and second precoder indices for first and second factors of a precoder, signaling overhead used to update a transmit precoder may be reduced. Moreover, by grouping first and second precoder indices so that each first precoder index is associated with a respective group of second precoder indices, processing overhead required to select second precoder indices during updates may be reduced. For example, once a first precoder index has been selected, only second precoder indices from the group associated with the selected first precoder index need to be considered.

Measuring the characteristic of the wireless channel may include measuring a characteristic of the wireless channel at a first time or frequency, selecting and transmitting the second precoder index may include selecting and transmitting an initial first precoder index, and processing signals may include processing signals received from the multiple antennas based on the first precoder index and the initial second precoder index. A characteristic of the wireless channel may be measured at a second time or frequency different than the first time or frequency, and responsive to measuring the characteristic of the wireless channel at the second time or frequency, a subsequent second precoder index different than the initial second precoder index may be selected. The subsequent second precoder index may be transmitted to the second communications device, and after transmitting the second tuning precoder index, signals received from the multiple antennas may be processed based on the first precoder index and the subsequent second precoder index. The second precoder index may thus be updated more frequently than the first precoder index so that a complete identification of a complete precoder matrix is not required for every precoder update.

According to some embodiments, a first communications device may include multiple antennas providing a grid of transmission beams (based on precoder feedback) and a receiver coupled to the multiple antennas. The receiver may be configured to receive a first precoder index and a second precoder index from a second communications device. A processor coupled to the multiple antennas and to the receiver may be configured to process at least one symbol stream based at least in part on the first and second precoder indices to generate antenna signals for respective antenna elements of the multiple antennas. A transmitter coupled to the processor may be configured to transmit the antenna signals over the respective antenna elements of the multiple antennas to the second communications device. For example, the processor may be configured to provide a precoder matrix responsive to the first and second precoder indices, and to process the at least one symbol stream using the provided precoder matrix to generate the antenna signals.

According to some embodiments, a first communications device may include a transceiver configured to provide wireless communications with a second communications device through an antenna and over a wireless channel, and the second communications device may include multiple antennas providing a grid of transmission beams (based on precoder feedback). A processor coupled to the transceiver may be configured to measure characteristics of the wireless channel over which the wireless communications are received from the second communications device. The processor may be further configured to select a first precoder index and a second precoder index responsive to measuring the characteristics of the wireless channel, to transmit the selected first and second precoder indices to the second communications device through the transceiver and the antenna, and to process signals received from the multiple antennas of the second communications device.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
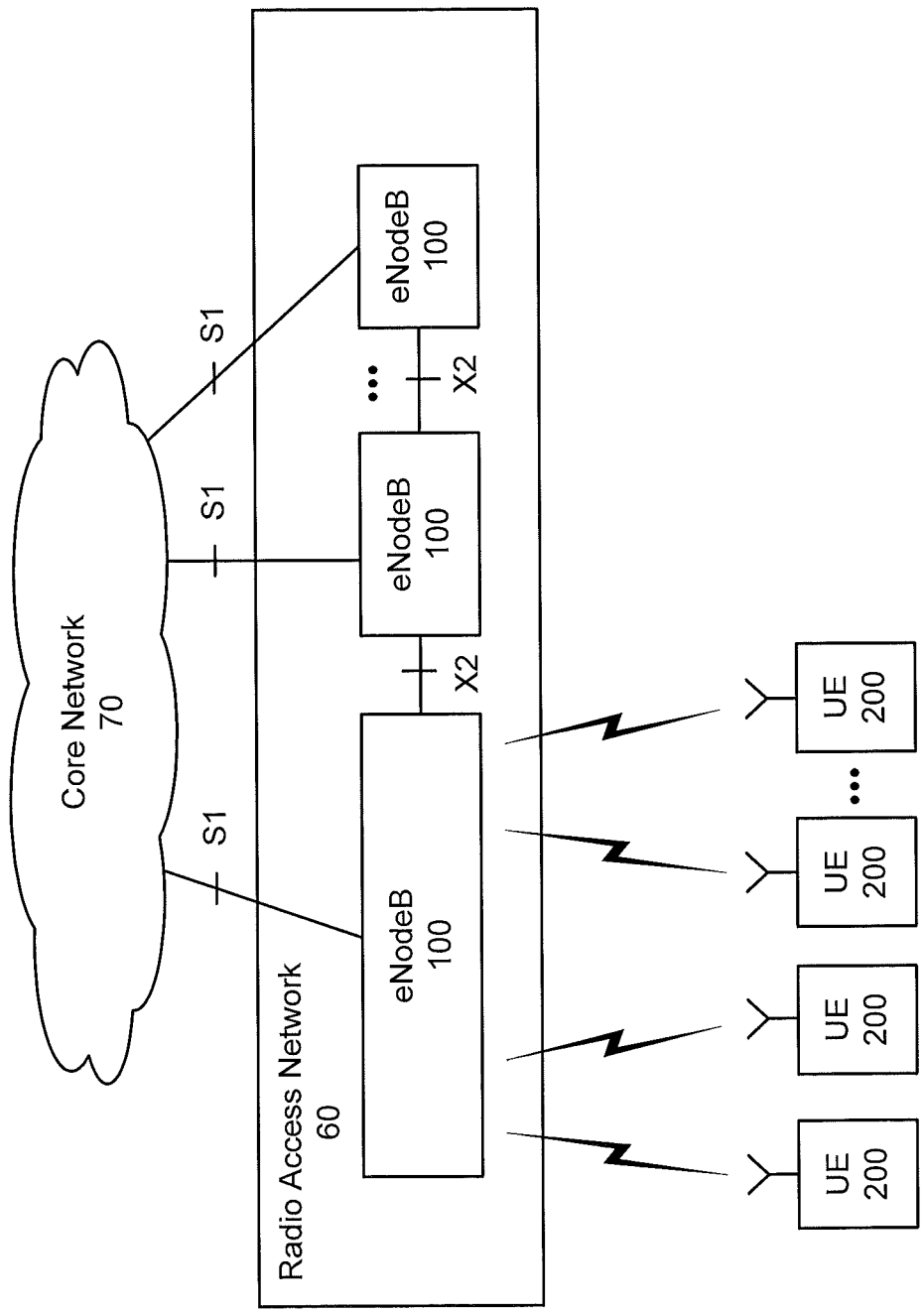
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with UEs. It will be understood, however, that the present invention is not limited to such embodiments and may be embodied generally in any type of communication network. As used herein, a UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband) and GSM (Global System for Mobile Communications), may also benefit from exploiting embodiments of the present invention disclosed herein.

Also note that terminology such as eNodeB (Evolved Node B) and UE (User Equipment) should be considering non-limiting and does not imply a certain hierarchical relation between the two. In general an "eNodeB" and a "UE" may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. The LTE RAN is a variant of a 3GPP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate with user equipment nodes (UEs) 200 that are within their respective communication service cells. The radio base stations 100 can communicate with one another through an X2 interface and with the core network(s) 70 through S1 interfaces, as is well known to one who is skilled in the art.

Figure 2:
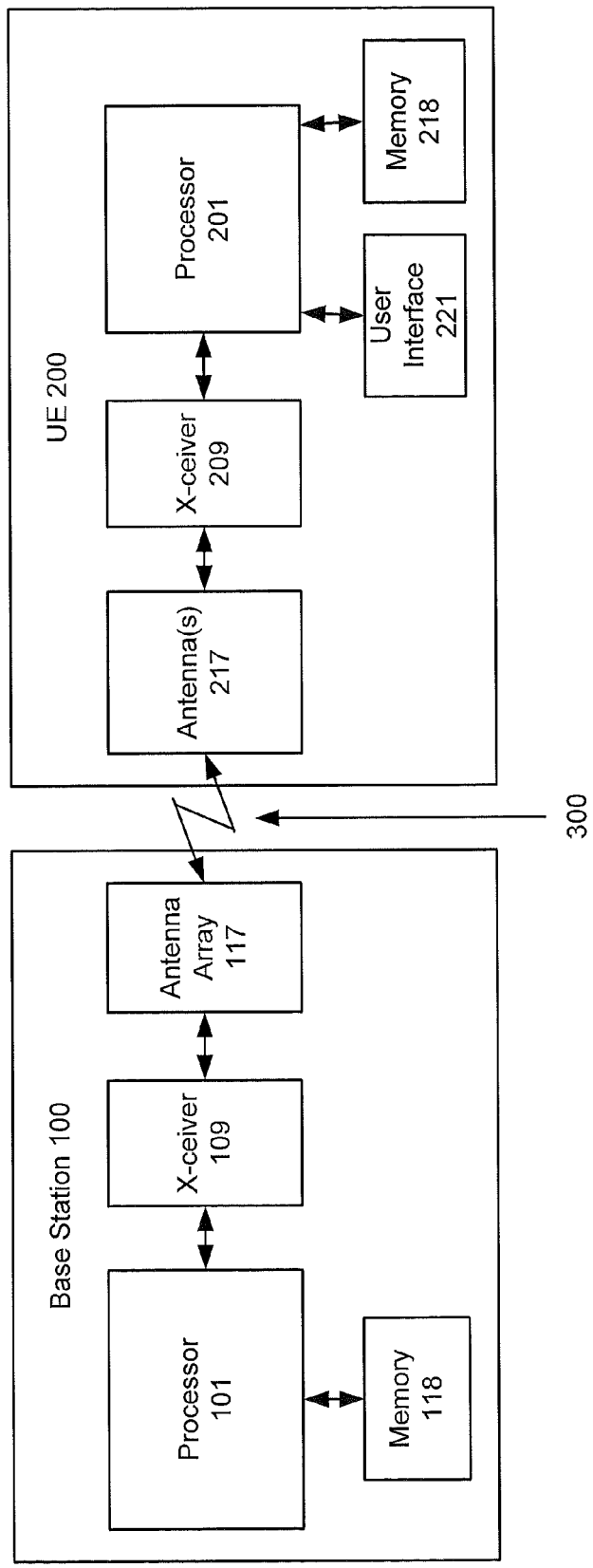
FIG. 2 is a block diagram of a base station and a UE in communication over a wireless channel according to some embodiments.

FIG. 2 is a block diagram of a base station 100 and a UE 200 of FIG. 1 in communication over a wireless channel 300 according to some embodiments of the present invention. As shown, base station 100 may include transceiver 109 coupled between processor 101 and antenna array 117 (including multiple antennas), and memory 118 coupled to processor 101. Moreover, UE 200 may include transceiver 209 coupled between antenna 217 and processor 201, and user interface 221 and memory 218 may be coupled to processor 201. Accordingly, base station 100 may transmit communications through transceiver 109 and antenna array 117 for reception at UE 200 through antenna 217 and transceiver 209, and UE 200 may transmit communications though transceiver 209 and antenna 217 for reception at base station 100 through antenna array 117 and transceiver 109.

Figure 3:
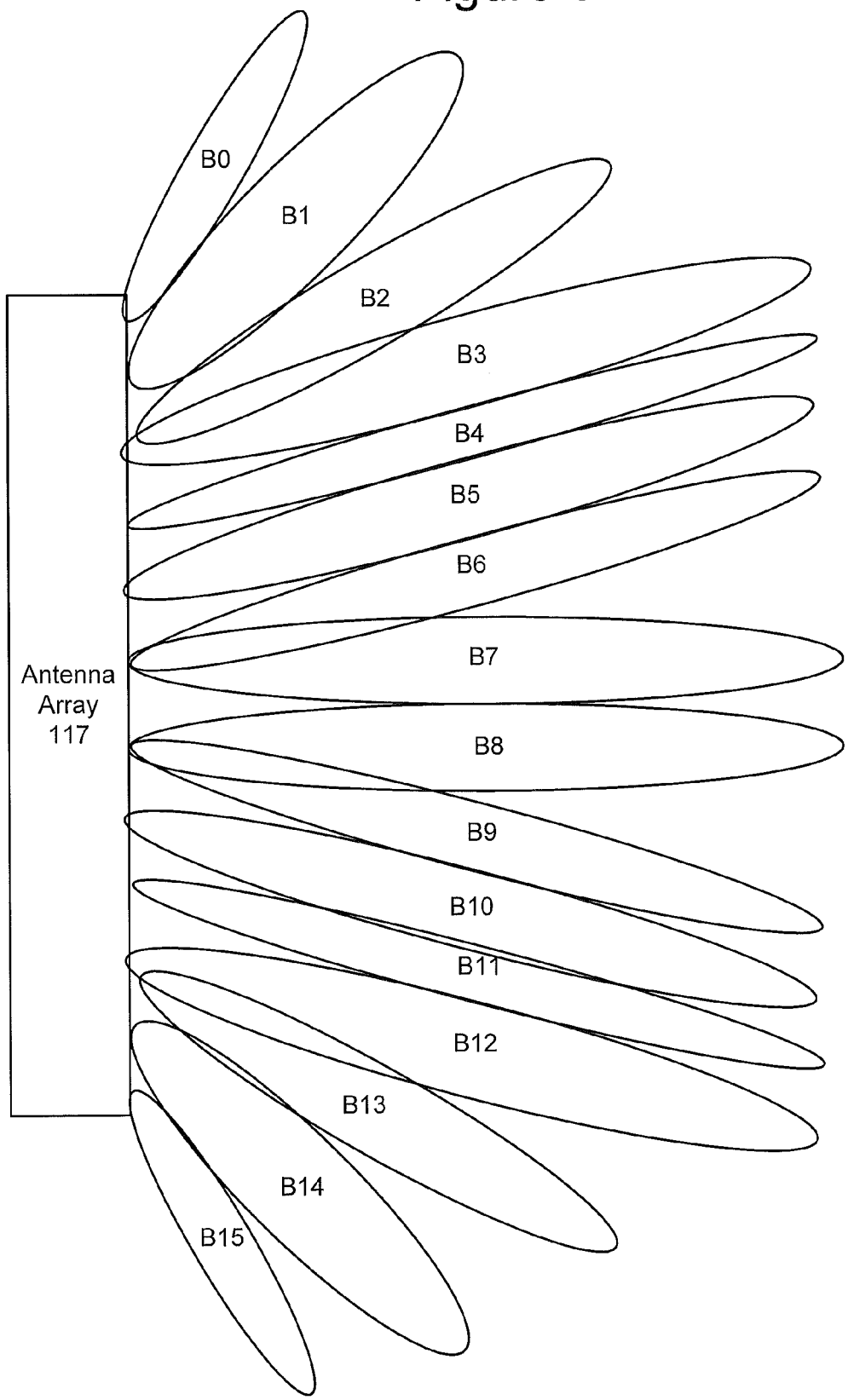
FIG. 3 is an a block diagram of a base station antenna array of FIG. 2 and a beam pattern provided thereby according to some embodiments.

FIG. 3 is a block diagram of antenna array 117 of base station 100 of FIG. 2 and a beam pattern provided by the antenna array based on precoder feedback. More particularly, antenna array 117 may including 8 transmit antenna elements providing a grid of sixteen transmission beams B0 to B15 (referred to as a grid of beams of GoB) based on precoder feedback. Antenna array 117, for example, may include four pairs of cross polarized antenna elements, with each pair including one antenna element having a first polarization and a second antenna element having a second polarization that is orthogonal with respect to the first polarization. Moreover, the transmissions beams B0 to B15 may be angularly distributed over a 120 degree sector of a cell serviced by base station 100, and adjacent beams may overlap.

Figure 4:
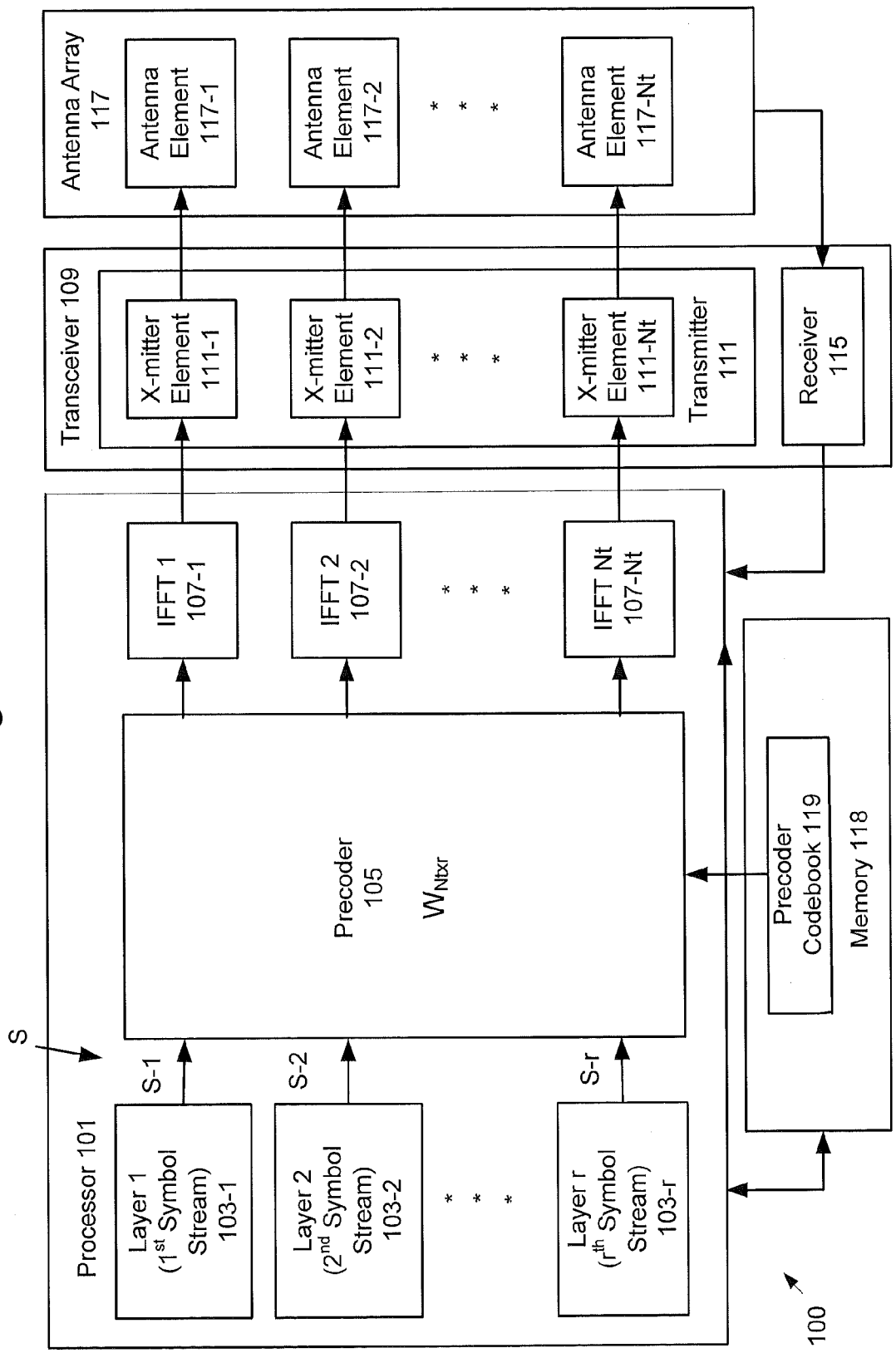
FIG. 4 is an enlarged block diagram of a base station of FIG. 2 according to some embodiments.

FIG. 4 is an enlarged block diagram of a base station of FIG. 2 according to some embodiments of the present invention. As shown in FIG. 4, processor 101 may be configured to process a symbol vector S including a plurality of symbol streams S-1 to S-r provided by layers 103-1 to 103-r for transmission to UE 200. More particularly, processor 101 defines a precoder matrix 105 (also referred to as a precoder $W_{Ntxr}$) configured to process layers 103-1 to 103-r and to generate respective antenna signals for transmission through transmitter elements 111-1 to 111-Nt and antenna elements 117-1 to 117-Nt. For example, antenna signals may be generated by precoder matrix 105 and processed through inverse fast Fourier transform (IFFT) elements 107-1 to 107-Nt and through transmitter elements 111-1 to 111-Nt of transmitter 109 for transmission through antenna elements 117-1 to 117-Nt of antenna array 117. Processor 101 may select precoder 105 from precoder codebook 119 (including a plurality of precoders) stored in memory 118. Transceiver 115 may also include receiver 115 configured to receive communications from UE 200 through channel 300 and antenna array 117.

As discussed herein, the rank r is the number of MIMO layers 103-1 to 103-r providing respective symbol streams S-1 to S-r, and Nt is the number of antenna elements 117-1 to 117-Nt included in antenna array 117. As discussed above with respect to FIG. 3, antenna array 117 may include 4 cross polarized pairs of antenna elements 117-1 to 117-8 (i.e., Nt=8) with odd antenna elements 117-1, 117-3, 117-5, and 117-7 having a first polarization and with even antenna elements 117-2, 117-4, 117-6, and 117-8 having a second polarization orthogonal to the first polarization.

As shown in FIG. 4, a single precoder 105 may be selected from a single precoder codebook 119. More particularly, each precoder in precoder codebook 119 (and thus each precoder available for selection by processor 101) may comprise a product of a conversion precoder matrix and a tuning precoder matrix, and the precoders may be so arranged in codebook 119 (for example with rows of precoders having the same conversion precoder factor and with columns of precoders having the same tuning precoder factor). Accordingly, separately received conversion precoder and tuning precoder indices (identifiers) may be used by processor 101 to select a precoder from codebook 119 having the identified conversion precoder and tuning precoder matrices as factors. UE 200 may thus measure characteristics of channel 300 to select conversion precoder and tuning precoder indices and to transmit these indices at different times and/or at different frequencies. Processor 101 can thus use these separately received conversion precoder and tuning precoder indices to provide an appropriate precoder from codebook 119.

Figure 5:
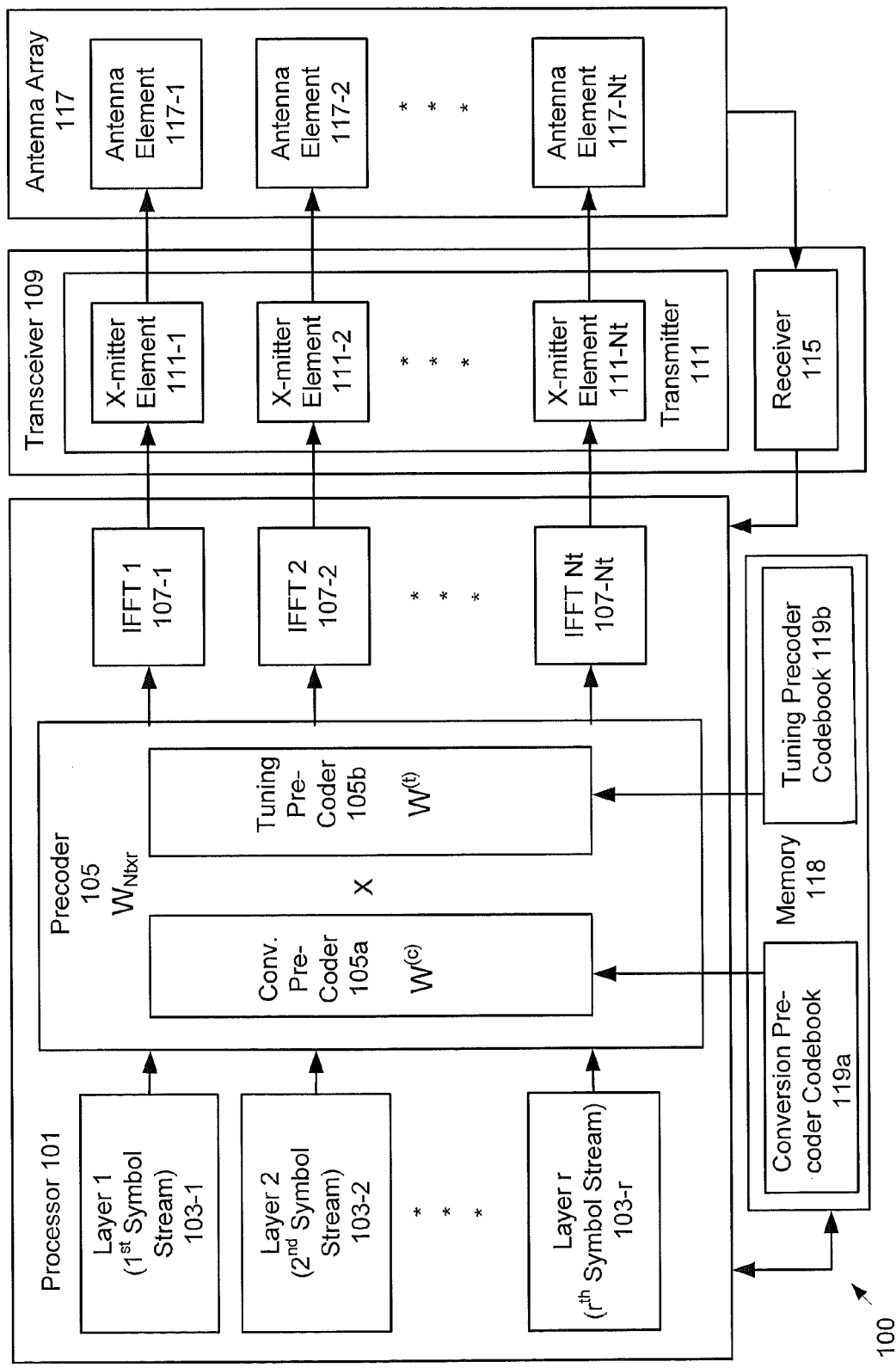
FIG. 5 is an enlarged block diagram of a base station of FIG. 2 according to some other embodiments.

As shown in FIG. 5, precoder 105 may include separate conversion precoder 105a (also referred to as conversion precoder matrix and/or $W^{(c)}$) and tuning precoder 105b (also referred to as tuning precoder matrix and/or $W^{(t)}$) selected from separate conversion and tuning precoder codebooks 119a and 119b in memory 118. The overall precoder 105 of FIG. 5 is thus a product of two separate precoders selected from separate codebooks 119a and 119b. Otherwise all elements of FIG. 5 are the same as those illustrated in FIG. 4. Accordingly, separately received conversion precoder and tuning precoder indices (identifiers) may be used by processor 101 to select a conversion and tuning precoders from codebooks 119a and 119b. UE 200 may thus measure characteristics of channel 300 to select conversion precoder and tuning precoder indices and to transmit these indices at different times and/or at different frequencies. Processor 101 can thus use these separately received conversion precoder and tuning precoder indices to provide an appropriate conversion and tuning precoders from codebooks 119a and 119b.

Figure 6:
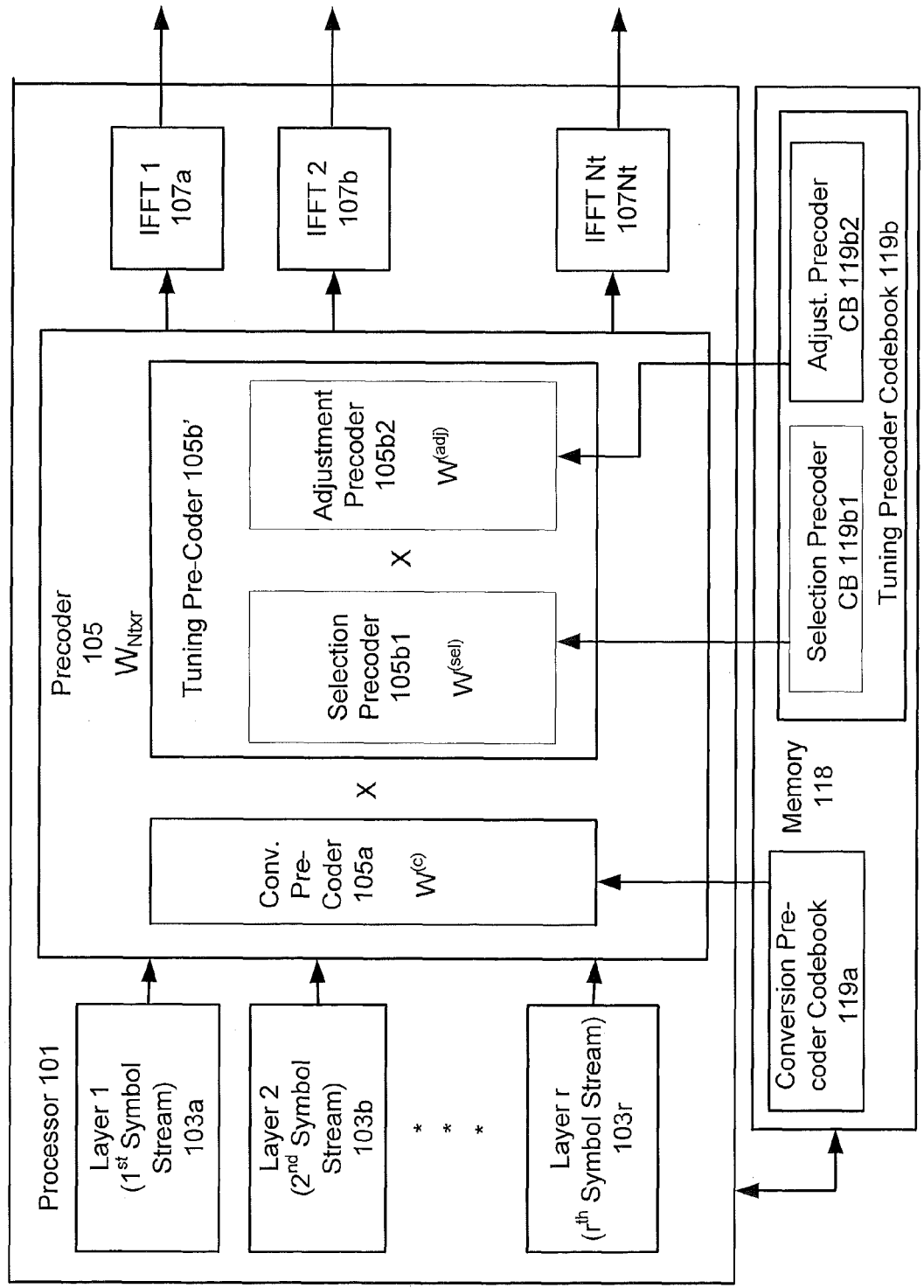
FIG. 6 is an enlarged block diagram of a base station of FIG. 2 according to still other embodiments.

As shown in FIG. 6, precoder 105 may include separate conversion precoder 105a (also referred to as conversion precoder matrix and/or $W^{(c)}$) and tuning precoder 105b' (also referred to as tuning precoder matrix and/or $W^{(t)}$), with tuning precoder 105b' including separate selection precoder 105b1 (also referred to as selection precoder matrix and/or $W^{(sel)}$) and adjustment precoder 105b2 (also referred to as adjustment precoder matrix and/or $W^{(adj)}$). In FIG. 6, processor 101 may select conversion precoder 105a, selection precoder 105b1, and adjustment precoder 105b2 from separate conversion, selection, and adjustment precoder codebooks 119a, 119b1, and 119b2 in memory 118. The overall precoder 105 of FIG. 6 is thus a product of three separate precoders selected from separate codebooks 119a, 119b1, and 119b2. Otherwise all elements of FIG. 6 are the same as those illustrated in FIGS. 4 and 5. Accordingly, separately received conversion precoder, selection precoder, and adjustment precoder indices (identifiers) may be used by processor 101 to select a conversion, selection, and adjustment precoders from codebooks 119a, 119b1, and 119b2. UE 200 may thus measure characteristics of channel 300 to select conversion, selection, and adjustment precoder indices and to transmit these indices at different times and/or at different frequencies. Processor 101 can thus use these separately received conversion, selection, and adjustment precoder indices to provide appropriate conversion and tuning precoders from codebooks 119a and 119b. For purposes of disclosure herein, selection precoder 105b1 and adjustment precoder 105b2 may be considered elements of a tuning precoder 105b', and selection and adjustment precoder indices may be considered elements of a tuning precoder index.

Referring again to FIG. 2, UE 200 transceiver 209 is configured to provide wireless communications with base station 100 through antenna 217 and over wireless channel 300. In addition, processor 201 is configured to measure characteristics of wireless channel 300 over which wireless communications are received from base station 100, to select a conversion precoder index and a tuning precoder index responsive to measuring the characteristics of the wireless channel 300) and to transmit the selected conversion and tuning precoder indices to base station 100 through the transceiver 209 and the antenna 217. Moreover, processor 201 may be configured to select/transmit the conversion and tuning precoder indices at different times/frequencies. Processor 201 is then configured to process signals received from the antenna array 117 of the base station 100 after transmitting the selected conversion and tuning precoder indices. As discussed above with respect to FIG. 6, the tuning precoder index may include separate selection and adjustment precoder indices.

FIG. 4 thus illustrates precoded spatial multiplexing in LTE where r layers (Layer-1 to Layer-r) generate symbol vector S including r symbol streams S-1 to S-r that are processed by precoder matrix $W_{Ntxr}$ and Nt inverse fast Fourier transforms IFFT-1 to IFFT-Nt to generate Nt antenna signals for respective transmit antenna elements 117-1 to 117-Nt, where r is the number of symbol streams and Nt is the number of transmit antenna elements.

As shown in FIG. 4, information carrying symbol vector S (including r symbol streams S-1 to S-r) is multiplied by $N_T \times r$ precoder matrix $W_{Ntxr}$ of precoder 105, to distribute the transmit energy of the symbol vector S in a subspace of $N_T$ (corresponding to $N_T$ transmit antenna elements) dimensional vector space. The precoder matrix $W_{N_T \times r}$ may be selected from a precoder codebook 119 of possible precoder matrices stored in memory 118, and a unique a precoder matrix indicator (PMI) may be used to identify each precoder matrix in codebook 119 for a given number of symbol streams. If the precoder matrix is confined to have orthonormal columns, then the design of the codebook 119 of precoder matrices may correspond to a Grassmannian subspace packing problem. The r symbols of symbol vector S each correspond to a respective layer (Layer-1 to Layer-r) and r is referred to as the transmission rank. Spatial multiplexing may thus be achieved since multiple symbols can be transmitted simultaneously over the same time/frequency resource element (TFRE) to the same communications device (e.g., UE 200). The number of symbols r is typically adapted to suit the current channel properties.

LTE uses OFDM (Orthogonal Frequency Division Multiplexing) in the downlink and DFT (Discrete Fourier Transform) precoded OFDM in the uplink, and hence the received $N_R \times 1$ vector $y_n$ for a certain TFRE on subcarrier n (or alternatively data TFRE number n) is thus modeled by equation (1):

$$y_n = H_n W_{N_T \times r} s_n + e_n, \quad (1)$$

where $e_n$ is a noise/interference vector obtained as realizations of a random process. The precoder, $W_{N_T \times r}$, can be a wideband precoder, which is constant over frequency, or frequency selective.

The precoder matrix $W_{N_T \times r}$ is often chosen to match the characteristics of the $N_R \times N_T$ MIMO channel matrix H, resulting in so-called channel dependent precoding. This is also commonly referred to as closed-loop precoding and essentially strives to focus the transmit energy into a subspace which is strong in the sense of conveying much of the transmitted energy to the UE. In addition, the precoder matrix $W_{N_T \times r}$ may also be selected to strive to orthogonalize the channel, meaning that after proper linear equalization at the UE 200, inter-layer interference may be reduced.

In closed-loop precoding for an LTE downlink, UE 200 transmits recommendations (based on channel measurements in the forward link or downlink) to base station 100 of a suitable precoder matrix to use. A single precoder matrix that is supposed to cover a large bandwidth (wideband precoding) may be fed back. It may also be beneficial to match the frequency variations of the channel and instead feed back a frequency-selective precoding report (e.g. several precoders, one per subband). This is an example of the more general case of channel state information (CSI) feedback, which also encompasses feeding back other entities than precoders to assist base station 100 in subsequent transmissions to UE 200. Such other information may include channel quality indicators (CQIs) as well as transmission rank indicator (RI).

For the LTE uplink, the use of closed-loop precoding means base station 100 is selecting precoder(s) and transmission rank and thereafter signals the selected precoder that the UE is supposed to use. The transmission rank r, and thus the number of spatially multiplexed layers (Layer-1 to Layer-r), is reflected in the number of columns r of the precoder matrix. For efficient performance, it may be important that a transmission rank that matches the channel properties is selected. Often, the device selecting precoders is also responsible for selecting the transmission rank, for example, by evaluating a performance metric for each possible rank and picking the rank which provides the highest performance according to the performance metric. These types of calculations may be computationally burdensome, and it may therefore be an advantage if calculations can be re-used across different transmission ranks. Re-use of calculations is facilitated by designing precoder codebook 119 to fulfill a so-called rank nested property whereby the codebook is designed such that there always exists a column subset of a higher rank precoder that is also a valid lower rank precoder.

The 4 Tx House Holder codebook in an LTE downlink is an example of a codebook where the rank nested property is fulfilled. This property is not only useful to reduce computational complexity, but may also simplify overriding a rank selection at another device than the device that has chosen the transmission rank. Consider for example an LTE downlink where UE 200 is selecting precoder and rank and conditioned on such a choice, computes CQI representing the quality of the effective channel formed by the selected precoder and the channel. Since the CQI is being reported conditioned on a certain transmission rank, performing rank override at base station 100 may make it difficult to know how to adjust the CQi to take the new rank into account. If precoder codebook 118 fulfills the rank nested property, however, overriding the rank to a lower rank precoder is possible by selecting a column subset of the original precoder. Since the new precoder is a column subset of the original precoder, the CQI tied to the original precoder gives a lower bound on the CQI if the new reduced rank precoder is used. Such bounds can be exploited to reduce the CQI errors associated with rank override, thereby improving the performance of the link adaptation.

Another issue to take into account when designing precoders is to provide an efficient use of transmission power amplifiers (PAs), for example, included in respective transmitter elements 111-1 to 111-Nt. Usually, power cannot be borrowed across different transmitter and/or antenna elements of an array since there is a separate PA for each antenna element 117-1 to 117-Nt. Hence, for increased/maximum use of PA resources, it may be desirable/important that the same amount of power is transmitted from each transmitter element 111-1 to 111-Nt and antenna element 117-1 to 117-Nt, e.g., a precoder matrix W should fulfill equation 2:

$$[WW^*]_{mm} = \kappa, \forall m \quad (2)$$

Thus, it may be beneficial from a PA utilization point of view to enforce this constraint when designing precoder codebook 119. Full power utilization may also be ensured by the so-called constant modulus property, which means that all scalar elements in a precoder have the same norm (modulus). It is easily verified that a constant modulus precoder also fulfills the full PA utilization constraint in equation 2 and hence the constant modulus property may constitute a sufficient but not necessary condition for full PA utilization.

Maintaining low signaling overhead may be an important or even critical design target in a wireless communications system. Signaling of precoders can easily consume a large portion of the resources unless carefully designed. The structure of possible precoders and the overall design of precoder codebook 119 may play an important role in reducing signaling overhead low. A promising precoder structure involves decomposing the precoder into two matrices, referred to as a factorized precoder, where the precoder can then be written as a product of two factors as shown in Equation 3:

$$W_{N_T \times r} = W_{N_T \times k}^{(c)} W_{k \times r}^{(t)}, \quad (3)$$

where an $N_T \times k$ conversion precoder $W_{N_T \times k}^{(c)}$ strives to capture wideband/long-term properties of channel 300 (e.g., a correlation) while a $k \times r$ tuning precoder $W_{k \times r}^{(t)}$ targets frequency-selective/short-term properties of channel 300. Together, the product of the conversion and tuning precoders form the overall precoder $W_{N \times r}$ which is induced by the signaled entities. The conversion precoder may be (but not necessarily) reported by UE 200 with a coarser granularity in time and/or frequency than the tuning precoder to save overhead and/or complexity. The conversion precoder may serve to exploit correlation properties to focus the tuning precoder in "directions" where the channel on average is "strong". This may be accomplished by reducing the number of dimensions k over which the tuning precoder should cover, i.e., the conversion precoder $W_{N_T \times k}^{(c)}$ may become a relatively tall matrix with a reduced number of columns and consequently the number of rows k of the tuning precoder $W_{k \times r}^{(t)}$ may be reduced as well. With such a reduced number of dimensions, the codebook for the tuning precoder (which may easily consume most of the signaling resources used for precoder updates since it needs to be updated with relatively fine granularity) can be made smaller while maintaining good performance.

The conversion and the tuning precoders may have respective different codebooks 119a and 119b stored in memory 118 as shown in FIG. 5. The conversion precoder 105a targets having high spatial resolution and thus conversion precoder codebook 119a may have relatively many elements. In contrast, the tuning precoder codebook 1119b may need to be relatively small to keep the signaling overhead at a reasonable level.

To see how correlation properties are exploited and dimension reduction is achieved, a case of an antenna array 117 with a total of $N_T$ antenna elements 117-1 to 117-Nt arranged into $N_T/2$ closely spaced cross-poles is considered. Based on the polarization direction of the antenna elements, the antenna elements in the closely spaced cross-pole setup can be divided into two groups, where each group is a closely spaced co-polarized ULA (Uniform Linear Array) with $N_T/2$ antenna elements (e.g., with even numbered antenna elements having a first polarization and with odd numbered antenna elements having a second polarization orthogonal to the first polarization). Closely spaced antenna elements may often lead to high channel correlation and the correlation can in turn be exploited to maintain low signalling overhead. Channels corresponding to each such antenna group ULA are denoted $H_/$ and $H_\backslash$, respectively. For convenience in notation, the subscripts indicating the dimensions of the matrices as well as the subscript n are being dropped hereafter. Assuming now that the conversion precoder $W^{(c)}$ has a block diagonal structure as shown in Equation (4):

$$W^{(c)} = \begin{bmatrix} \tilde{W}^{(c)} & 0 \\ 0 & \tilde{W}^{(c)} \end{bmatrix} \quad (4)$$

the product of the MIMO channel 300 and the overall precoder can then be written as:

$$HW = [H_/ \; H_\backslash]W^{(c)}W^{(t)}$$

$$= [H_/ \; H_\backslash]\begin{bmatrix} \tilde{W}^{(c)} & 0 \\ 0 & \tilde{W}^{(c)} \end{bmatrix}W^{(t)}$$

$$= [H_/ \tilde{W}^{(c)} \; H_\backslash \tilde{W}^{(c)}]W^{(t)} = H_{eff}W^{(t)}$$

As seen, the matrix $\tilde{W}^{(c)}$ separately precodes each antenna element group ULA forming a smaller and improved effective channel $H_{eff}$. If $\tilde{W}^{(c)}$ corresponds to a beamforming vector, the effective channel would reduce to having only two virtual antenna elements, which reduces the needed size of the codebook used for the second tuning precoder matrix $W^{(t)}$ when tracking the instantaneous channel properties. In this case, instantaneous channel properties are to a large extent dependent upon the relative phase relation between the two orthogonal polarizations.

Some theory concerning grid of beams (GoB) and DFT based precoding will now be provided for later reference. DFT based precoder vectors for $N_T$ transmit antenna elements can be written on the form shown in Equation (5):

$$w_n^{(N_T,Q)} = \begin{bmatrix} w_{1,n}^{(N_T,Q)} & w_{2,n}^{(N_T,Q)} & \cdots & w_{N_T,n}^{(N_T,Q)} \end{bmatrix}^T \quad (5)$$

$$w_{m,n}^{(N_T,Q)} = \exp\left(j\frac{2\pi}{N_T Q}mn\right),$$

$$m = 0, \ldots, N_T - 1, n = 0, \ldots, QN_T - 1$$

where $w_{m,n}^{(N_T,Q)}$ is the phase of the $m^{th}$ antenna element, n is the precoder vector index (i.e., which beam out of the $QN_T$ beams B as shown in FIG. 3) and Q is the oversampling factor. To provide good performance it may be important that the array gain function of two consecutive beams B overlap in the angular domain so that the gain does not drop too much when going from one beam to another. Usually, this requires an oversampling factor of at least Q=2. Thus, for $N_T$ antenna elements, at least $2N_T$ beams B may be needed. In the example of FIG. 3, 16 beams (e.g., beams B0 to B15) may be provided using 8 antenna elements (e.g., antenna elements 117-1 to 117-8) such that Nt=8.

An alternative parameterization of the above DFT based precoder vectors is shown below in Equation (6):

$$w_{l,q}^{(N_T,Q)} = \begin{bmatrix} w_{1,Ql+q}^{(N_T,Q)} & w_{2,Ql+q}^{(N_T,Q)} & \cdots & w_{N_T,Ql+q}^{(N_T,Q)} \end{bmatrix}^T \quad (6)$$

$$w_{m,Ql+q}^{(N_T,Q)} = \exp\left(j\frac{2\pi}{N_T}m\left(l + \frac{q}{Q}\right)\right)$$

for $$m = 0, \cdots, N_T - 1, l = 0, \cdots, N_T - 1, q = 0, 1, \cdots, Q - 1,$$

where l and q together determine the precoder vector index via the relation n=Ql+q. This parameterization also highlights that there are Q groups of beams B, where the beams B within each group are orthogonal with respect to each other. The $q^{th}$ group can be represented by the generator matrix $$G_q^{(N_T)} = [w_{0,q}^{(N_T,Q)} \; w_{1,q}^{(N_T,Q)} \ldots w_{N_T-1,q}^{(N_T,Q)}] \quad (7)$$

By making sure that only precoder vectors from the same generator matrix are being used together as columns in the same precoder, it may be relatively easy to form sets of precoder vectors for use in unitary precoding where the columns within a precoder matrix should form an orthonormal set.

To increase/maximize the performance of DFT based precoding, it may also be useful to center the grid of beams (generated by the transmit antenna elements of the transmit antenna array) symmetrically around the broad size of the array. Such rotation of the beams B can be done by multiplying from the left the above DFT vectors $w_n^{(N_T,Q)}$ with a diagonal matrix $W_{rot}$ having elements:

$$[W_{rot}]_{mm} = \exp\left(j\frac{\pi}{QN_T}m\right)$$

The rotation can either be included in the precoder codebook or alternatively carried out as a separate step where all signals are rotated in the same manner and the rotation can thus be absorbed into the channel from the perspective of the receiver (transparent to the receiver). Henceforth, when DFT based precoding is discussed, it is tacitly assumed that rotation may or may not have been carried out, i.e., both alternatives are possible without explicitly having to disclose it.

Dynamic selection of columns from the conversion precoder may be provided. The factorized precoder structure may be flexible. The block diagonal example in Equation (4) showed how a factorized precoder structure can accomplish dimension reduction to reduce the usually large overhead in signaling the tuning precoder $W^{(t)}$ in a frequency-selective/short-term fashion. But it is also possible to relax the requirements on dimension reduction by increasing the number of columns in the conversion precoder $W^{(c)}$ and letting $W^{(t)}$ perform column selection from $W^{(c)}$. As shown in FIG. 6, tuning precoder codebook 119*b* may include separate selection precoder codebook 119*b*1 and adjustment precoder codebook 119*b*2, and precoder 105 (W) may be decomposed into separate conversion ($W^{(c)}$), selection ($W^{(sel)}$), and adjustment ($W^{(adj)}$) precoders 105*a*, 105*b*1, and 105*b*2. In general, the overall precoder W (105) can thus be decomposed into three factors as shown in Equation (8):

$$W = W^{(c)} W^{(t)} = W^{(c)} W^{(sel)} W^{(adj)}$$

$$: W^{(c)} = [w_1^{(c)} \ w_2^{(c)} \ \ldots \ w_K^{(c)}]$$

$$W^{(t)} = W^{(sel)} W^{(adj)} \quad (8)$$

where $w_k^{(c)}$ denotes the $k^{th}$ column of the conversion precoder $W^{(c)}$ and the tuning precoder $W^{(t)}$ is now decomposed as a product of a matrix as shown in Equation (9):

$$W^{(sel)} = \begin{bmatrix} 0_{k_1} & 0_{k_2} & \cdots & 0_{k_N} \\ 1 & 1 & \cdots & 1 \\ 0 & 0 & 0 & 0 \end{bmatrix} \quad (9)$$

that selects N columns out of $W^{(c)}$ and an adjustment precoder as shown in Equation (10):

$$W^{(adj)} = \begin{bmatrix} w_{11}^{(adj)} & w_{12}^{(adj)} & \cdots & w_{1N}^{(adj)} \\ w_{21}^{(adj)} & w_{22}^{(adj)} & & w_{2N}^{(adj)} \\ \vdots & & \ddots & \vdots \\ w_{N1}^{(adj)} & w_{N2}^{(adj)} & \cdots & w_{NN}^{(adj)} \end{bmatrix} \quad (10)$$

that precodes the effective $N_r \times N$ channel matrix $H_{eff} = HW^{(t)} W^{(sel)}$ by phase and/or amplitude adjustments. Here, $0_k$ denotes a k×1 column vector with all elements equal to zero.

A possible advantage of this kind of fast column selection structure is that the degree of dimension reduction can be made to suit the channel scenario and that there is the possibility of precoding in a frequency-selective/short-term manner directly for the full channel. Thus, precoding gains may be expected to be maintained even if the correlation is low.

When performing dynamic conversion precoder column selection as in equations (8)-(10), however, the signaling overhead may be large unless a careful choice of which columns to include in $W^{(c)}$ is made. For example, in a typical case of selection of 16 different GoB (Grid of Beams) beams (e.g., beams B0 to B15 of FIG. 3), K would be 16 and selection via $W^{(sel)}$ would on its own require 4 bits per update of W in addition to the overhead for signaling $W^{(adj)}$. This may result in a high signaling overhead and high UE precoder selection complexity.

According to some embodiments of the present invention, problems with signaling overhead and UE complexity for dynamic column selection techniques for factorized precoding disclosed above may be reduced by dividing a set of precoder base columns into smaller base column groups and letting the precoder base columns in each base column group form a conversion precoder $W^{(c)}$. The selection of a conversion precoder $W^{(c)}$ for feedback reporting then corresponds to selecting a base column group, and the tuning precoder $W^{(t)}$ is thereafter involved in selecting columns for precoding from this smaller group.

The division into base column groups is such that the choice of conversion precoder $W^{(c)}$ can be performed based on long-term/wideband channel properties (reduction of precoder base columns), while the precoder base columns within a group allows frequency/time-varying channel properties to be tracked. Precoder base column grouping strategies may include a sliding window of GoB (Grid of Beams) based beams with and without beam wrapping for signal subspace refinement in correlated channel scenarios, groups of purely orthogonal beams for coarse signal subspace steering in uncorrelated channel scenarios, combinations of refinement and coarse subspace steering and allowing dynamic choice of conversion precoder dimension.

Precoder columns can be DFT based and/or House Holder based (with/without refinement), and the conversion precoder may obey particular structures such as diagonal or block diagonal (with or without block adjustment). The matrix multiplication forming the overall precoder can also be written in the opposite order where the tuning precoder is operating directly on the channel and implementing similar subspace refinement/steering strategies as mentioned above.

It should also be kept in mind that the described precoder codebooks can constitute subsets of larger codebooks. Thus, embodiments of the present invention can be applied together in conjunction with additional precoder elements obeying other structures. The elements in a precoder codebook may moreover be multiplied by a fixed and common matrix and still be considered equivalent with codebooks discussed herein.

As mentioned above, some embodiments of the present invention relate to dividing the set of possible precoder columns (more precisely referred to as precoder base columns) into several base column groups and only letting the tuning precoder $W^{(t)}$ select from these smaller groups. Let Equation (11) below $$P_c = \{v_0, v_1, \ldots, v_{M-1}\}, \quad (11)$$

denote the set of M elements of precoder base columns. This set is divided into base column groups where each group is represented by a K-tuple of K precoder base columns and the precoder base columns of each K-tuple, $G_l^{(c)}$, l=1, 2, ..., L, can be directly placed into a conversion precoder $W_l^{(c)}$, l=1, 2, ..., L. The conversion precoder $W^{(c)}$ for feedback is selected from the set of possible conversion precoders as shown, for example, in Equation (12):

$$W^{(c)} \in C^{(c)} = \{W_1^{(c)}, W_2^{(c)}, \ldots, W_L^{(c)}\} \quad (12)$$

where $C^{(c)}$ is a conversion precoder codebook 119*a* for the conversion precoder $W^{(c)}$.

Generally, the columns of the conversion precoder $W^{(c)}$ do not necessarily have to come directly from the K-tuple $G_l^{(c)}$. The conversion precoder can alternatively be formed based on $P_c$ via a matrix-valued function, such as Equation (13):

$$W_l^{(c)} = f_l(G_l^{(c)}) \quad (13)$$

The simplest matrix-valued function is the identity function shown in Equation (14):

$$f_l(x_1, x_2, \ldots, x_K) = [x_1 \, x_2 \ldots x_K] \qquad (14)$$

which corresponds to the above case of forming each conversion precoder directly from $G_l^{(c)}$. Other possibilities include introducing a block-diagonal structure as shown in Equation (15):

$$f_l(x_1, x_2, \cdots, x_K) = \begin{bmatrix} x_1 & x_2 & \cdots & x_{K/2} & 0 & 0 & 0 & 0 \\ 0 & 0 & 0 & 0 & x_{K/2} & x_{K/2+1} & \cdots & x_K \end{bmatrix} \qquad (15)$$

with possibly different blocks or a block-diagonal structure, as shown in Equation (16):

$$f_l(x_1, x_2, \cdots, x_K) = \begin{bmatrix} x_1 & x_2 & \cdots & x_K & 0 & 0 & 0 & 0 \\ 0 & 0 & 0 & 0 & x_1 & x_2 & \cdots & x_K \end{bmatrix} \qquad (16)$$

where the blocks are the same. It is also possible to have more than two blocks, combined with either the making all the blocks the same or allowing different blocks. Block diagonal structures are especially suitable for cross-polarized antenna deployments but they are in fact also efficient for other deployments as well.

As previously mentioned, the tuning precoder $W^{(t)}$ is used for column selection as well and can be decomposed into a selection matrix $W^{(sel)}$ and an adjustment matrix $W^{(adj)}$ as shown in FIG. 6. In the simplest case, each column in the selection matrix selects a single column out of the conversion precoder $W^{(c)}$, i.e., each column has just one non-zero element and thus:

$$W^{(sel)} = \begin{bmatrix} 0_{k_1} & 0_{k_2} & \cdots & 0_{k_N} \\ 1 & 1 & \cdots & 1 \\ 0 & 0 & 0 & 0 \end{bmatrix}. \qquad (17)$$

But selecting multiple columns from $W^{(c)}$ for each column in the selection precoder $W^{(sel)}$ is also a possibility. This is particularly suitable for the block diagonal structures described above. For example, in Equation (15) it may be beneficial to let two columns, one from each block, be selected. In other words, the selection precoder matrix may have the structure shown in Equation (18):

$$W^{(sel)} = \begin{bmatrix} 0_{k_1^{(1)}} & 0_{k_2^{(1)}} & \cdots & 0_{k_N^{(1)}} \\ 1 & 1 & \cdots & 1 \\ 0_{k_1^{(2)}} & 0_{k_2^{(2)}} & & 0_{k_N^{(2)}} \\ 1 & 1 & & 1 \\ 0 & 0 & \cdots & 0 \end{bmatrix} \qquad (18)$$

where $k_n^{(m)}$ determines the $m^{th}$ selected conversion precoder column for the $n^{th}$ column in the selection matrix. Making $k_n^{(2)} = k_n^{(1)} + K/2$ in conjunction with the conversion precoder structure in Equation (16) ensures that the two selected columns from the conversion precoder come from the same precoder base columns. This arrangement may make sense, in particular, for a closely spaced cross-polarized antenna array setup where the correlation is typically the same for channels within the same antenna group (corresponding to the same antenna polarization) and hence the same precoder is suitable for both antenna groups. If phase adjustment between polarizations is also desired, the second row of ones in Equation (18) may be replaced with complex-valued phasors taken, for example, from a PSK alphabet.

Note also that the invention is not necessarily restricted to be applied in the case of tuning precoders decomposed according to $W^{(t)} = W^{(sel)} W^{(adj)}$. It is also possible to have more arbitrary combinations of selection and adjustment by not imposing such a product structure. As we will see in following examples, it is also possible to interchange the order of the selection and adjustment matrices, i.e., $W^{(t)} = W^{(sel)} W^{(adj)}$.

Also, the order of the conversion and the tuning precoder may be switched. That is, it may sometimes be simpler to consider the problem when the overall precoder is obtained as shown in Equation (19):

$$W = W^{(t)} W^{(c)} \qquad (19)$$

The tuning precoder in this case may be a diagonal matrix tuning the signaling subspace given by the conversion precoder.

The division of precoder base columns into groups requires special attention to ensure efficient operation. For example, if the order of the precoder base columns are ignored and moreover duplicates avoided, there are $$\binom{M}{K}$$

ways to select K columns for $W^{(c)}$ out of the M precoder base columns in $P_c$. So if M corresponds to the conceivable case of 16 different GoB precoders and $W^{(c)}$ is K=4 columns wide, there are $$\binom{16}{4} = 1820$$

different ways of selecting $W^{(c)}$. Clearly not all of them can be supported if signaling overhead and/or UE precoder selection complexity is of concern. Grouping strategies may thus be an important aspect of some embodiments of the present invention and several possibilities exist as exemplified below.

According to some embodiments of the present invention, a sliding window of precoder columns from the grid of beams (B0 to B15) may be used to group base columns. In this example, the M precoder base columns in $P_c$ are ordered in a predetermined and fixed sequence $v_m$, m=0, 1, . . . , M−1, and each base column group $G_l^{(c)} = (x_1, x_2, \ldots, x_K)$ corresponds to K consecutive precoder base columns from the ordered sequence of all base columns. Different base column groups are obtained by choosing different starting points for the base column group as shown, for example, in Equation (20):

$$G_l^{(c)} = (v_{m(l)}, v_{m(l)+1}, \ldots, v_{m(l)+K-1}) \qquad (20)$$

where the index m(l) determines the starting point in the ordered sequence of all precoder base columns. A generalization of this grouping approach is to form a group based on every $n^{th}$ base column instead of from consecutive base columns. By way of example referring to the grid of beams of FIG. 3, precoder columns may be grouped according to the following groupings of consecutive beams: B0-B3; B1-B4; B2-B5; B3-B6; B4-B7; B5-B8, B6-B9; B7-B10; B8-B11;

B9-B12; B10-B13; B11-B14; and B12-B15. The base column groups would then look like:

$$G_l^{(c)} = (v_{m(l)}, v_{m(l)+\tilde{n}}, \ldots, v_{m(l)+(K-1)\tilde{n}}) \quad (21)$$

The starting index m(l) can be varied in different ways. One way is to let it linearly increase according to m(l)=ñl, l=0, 1, ..., L−1 with ñ precoder base columns in increment from one base column group to the next. This would correspond to obtaining the base column groups by means of a sliding window operation where the sliding rate is constant and equal to ñ.

So far, these embodiments all involve base columns in strictly increasing order. An alternative is to somewhat relax the constraint on base column ordering by performing wrapping so that the beginning and end of the ordered sequence of precoder base columns are considered to be next to each other. Wrapping can be accomplished via the modulo operator as seen in Equation (22):

$$G_l^{(c)} = (v_{m(l) \bmod M}, v_{(m(l)+\tilde{n}) \bmod M}, \ldots, v_{(m(l)+(K-1)\tilde{n}) \bmod M}) \quad (22)$$

A typical example of the sliding window approach is to let the precoder base columns correspond to a set of grid of beams where the ordering corresponds to increasing angles for the main lobes of the beams. For the case of an antenna array including 8 Tx (transmit) antenna elements, a promising a block diagonal conversion precoder may be used where each block is 4×4, the block is chosen from four consecutive beams, and the sliding window is moved one beam at a time with wrapping enabled. This creates 16 different conversion precoders having the structure shown in Equation (23):

$$X_l = [v_{l \bmod 16} \; v_{(l+1) \bmod 16} \; v_{(l+2) \bmod 16} \; v_{(l+3) \bmod 16}] \quad (23)$$

$$W_l^{(c)} = \begin{bmatrix} X_l & 0 \\ 0 & X_l \end{bmatrix}, l = 1, 2, \cdots, 16$$

By way of example referring to the grid of beams of FIG. 3, precoder columns may be grouped according to the following groupings of beams: B0-B3; B1-B4; B2-B5; B3-B6; B4-B7; B5-B8; B6-B9; B7-B10; B8-B11; B9-B12; B10-B13; B11-B14; B12-B15; B13-B15 and B0; B14-15 and B0-B1; and B15 and B0-B2.

Such a structure may be tailored for an antenna setup with four pairs of closely spaced cross-poles where the columns in $X_l$ take care of the precoding on an antenna group of four co-polarized antennas. The selection of columns from $W^{(c)}$ may in this case be performed jointly with phase adjustment between the polarizations using a tuning precoder as shown below:

$$W^{(t)} = \begin{bmatrix} 0_{k_1^{(1)}} & 0_{k_2^{(1)}} & 0_{k_3^{(1)}} & 0_{k_4^{(1)}} & 0_{k_5^{(1)}} & \cdots \\ 1 & 1 & 1 & 1 & 1 & \cdots \\ 0_{k_1^{(2)}} & 0_{k_2^{(2)}} & 0_{k_3^{(2)}} & 0_{k_4^{(2)}} & 0_{k_5^{(2)}} & \cdots \\ e^{j\theta_1} & -e^{j\theta_1} & e^{j\theta_2} & -e^{j\theta_2} & e^{j\theta_3} & \cdots \\ 0 & 0 & 0 & 0 & 0 & \cdots \end{bmatrix} \quad (24)$$

$$\theta_q \in \{2\pi \tilde{q}/Q : \tilde{q} = 1, 2, \cdots, Q\}$$

where $$k_{2\tilde{k}}^{(1)} = k_{2\tilde{k}-1}^{(1)}, \tilde{k} = 1, 2, \cdots \quad (25)$$
$$k_{\tilde{k}}^{(2)} = k_{\tilde{k}}^{(1)} + 4, \overline{k} = 1, 2, \cdots$$

can be enforced to ensure that the same column from $X_l$ is selected regardless of antenna group and that the same two columns are selected twice to create a pair of orthogonal columns in the overall precoder W. This process is repeated for every pair of columns 2i−1, 2i in $W^{(t)}$ while all the column pairs in $W^{(t)}$ select a unique pair of columns from $W^{(c)}$.

It is worthwhile to note how the tuning precoder in Equation (24) provides precoders for multiple transmission ranks. A rank r overall precoder is formed by taking the first r columns of $W^{(t)}$. As will be clear in the following, subsequent exemplary design can also use this kind of tuning precoder to create precoders of different transmission ranks.

A choice among the vectors in a sliding window of base columns from a GoB codebook can be viewed as performing subspace refinement on a subband/short-term level. Thus, the choice of the conversion precoder may coarsely set the signaling subspace while the selection of columns from the given conversion precoder performs signal subspace refinement to track small scale variations of the channel across frequency/time. Such an approach may be geared towards correlated channel scenarios where only small scale refinement are needed on a subband/instantaneous basis to slightly adjust a conversion precoder largely determined by the channel correlation.

The sliding window technique can in some parts also be described in terms of interchanging the order of the conversion precoder and the tuning precoder as shown in Equation (19). The tuning precoder is then a diagonal matrix creating the multiple columns previously contained in the base column group based on adjusting the phases of one of the base columns, which now is the only one being placed in the conversion precoder. In this case, no column selection is being performed and still a sliding window of base columns can be created. The selection of the conversion precoder then serves as pointing out the position of the sliding window by specifying a coarse beam while the tuning precoder refines the coarse beam and effectively implements an enumeration over the refined beams in the window. Phase adjustment between polarizations is achieved by dividing the diagonal tuning precoder into two parts where the second half of the diagonal elements have the possibility for a phase offset relative the first.

According to additional embodiments of the present invention, relatively low complexity algorithms for UE selection of precoders may further facilitate new precoder feedback. While exhaustive search over all conversion precoders and tuning precoders is possible, such an exhaustive search may be prohibitively expensive. Relatively low complexity algorithms may thus be provided for precoder selection for feedback that work in conjunction with precoder designs according to some embodiments of the present invention.

UE 200 can select the conversion precoder by matching it to the channel correlation matrix (or an estimate thereof), for example, using Equation (26):

$$W^{(c)} = \arg \max_l (W_l^{(c)})^* E[H^* H^*] W_l^{(c)} \quad (26)$$

Note that this selection may work even though the conversion precoder may be a square matrix since it still represents a well-confined subspace due to the sliding window disclosed above. Once the conversion precoder has been determined as above, the tuning precoder can be found by means of an exhaustive search evaluating, for example, expected throughput for each possible tuning precoder and transmission rank.

Sometimes the correlation matching step just gives a candidate conversion precoder added to a list of other candidate conversion precoders, which are later down-selected as part of an exhaustive search over the set of tuning precoders.

In an alternative, the conversion precoder can be selected based on the formula for ergodic channel capacity as shown in Equation (27):

$$C = E\left[\log \det\left(I + \frac{HW^{(c)}(W^{(c)})^* H^*}{\sigma^2}\right)\right], \quad (27)$$

where the conversion precoder is assumed to be fixed over the ensemble of channel realizations. The expectation operation, however, may be difficult to perform in a closed-form and may thus be impractical. However, a tractable lower bound on the channel capacity can be obtained by writing:

$$C = E\left[\log \det\left(I + \frac{(W^{(c)})^* H^* HW^{(c)}}{\sigma^2}\right)\right] \geq \quad (28)$$

$$\log \det\left(I + \frac{(W^{(c)})^* E[H^* H] W_i^{(c)}}{\sigma^2}\right)$$

The conversion precoder can then be chosen using Equation (29):

$$W^{(c)} = \arg \max_i \, \log \det\left(I + \frac{(W_i^{(c)})^* E[H^* H] W_i^{(c)}}{\sigma^2}\right) \quad (29)$$

Compared to the correlation matching approach, selection according to Equation (29) may strive to distribute the transmitted energy more evenly over the eigen-directions of the channel correlation and may thus be better suited to select between conversion precoders having a different number of columns. However, if the number of columns is the same for all possible conversion precoders, the correlation matching approach may work as well.

In previous examples using a sliding window, base columns which in some sense are "close" to each other (e.g., corresponding to groups of adjacent beams) were grouped together in the same conversion precoder. Typically, the base columns in a group are therefore not orthogonal to each other, hence motivating the interpretation of signaling subspace refinement performed by the tuning precoder. Embodiments considered now, however, may behave in the opposite manner where instead the base columns in a group are chosen to be orthogonal. The selection of columns by the tuning precoder then constitutes a coarse signal subspace steering as opposed to the refinement of the sliding window approach and is therefore suited to less correlated channel scenarios.

Consider again the example of base columns $v_m$, $m=0, 1, \ldots, M-1$, generated from DFT based grid of beams with beam oversampling factor of Q ordered in a sequence of increasing angle of main lobe. A base column group with orthogonal elements is now formed by taking every $Q^{th}$ base column in the ordered sequence to arrive at Equation (30):

$$G_l^{(c)} = (v_{m(l)}, v_{m(l)+Q}, \ldots, v_{m(l)+(K-1)Q}), \quad (30)$$

where starting indices can vary to create different sets of base column groups and one possibility is to restrict to:

$$m(l) = 0, 1, \ldots, Q-1 \quad (31)$$

and letting K=Q. A fixed index offset may be provided between consecutive beams in the base column group with a maximum of Q different base column groups. Another alternative is to choose the set of base column indices $\{m_k^{(l)}\}$ so that:

$$G_l^{(c)} = (v_{m_1^{(l)}}, v_{m_2^{(l)}}, \ldots, v_{m_K^{(l)}})$$

$$m_k^{(l)} \bmod Q = m_{constant}^{(l)}, \forall k$$

$$m_k^{(l)} \neq m_{k'}^{(l)}, k \neq k' \quad (32)$$

This guarantees orthogonality within a base column set while allowing schemes where the base column set have fewer columns than Q, e.g., selecting K=2 while Q=4. By way of example referring to the grid of beams of FIG. 3, precoder columns may be grouped according to the following groupings of orthogonal beams: B0, B4, B8, and B12; B1, B5, B9, and B13; B2, B6, B10, and B14; and B3, B7, B11, and B15.

The base column groups can be used to form a conversion precoder in much the same way as in the refinement case, i.e., directly giving the columns of the conversion precoder or, for example, forming an antenna group precoder in a block diagonal structure.

As hinted at in the beginning of this section, the selection of columns by the tuning precoder performs a coarse steering of the signaling subspace. In contrast, the choice of conversion precoder involves a refinement of the signal subspace on a wideband/long term basis—quite the opposite of the sliding window approach.

Note that the concept of refinement and orthogonal precoder columns can be combined. Thus, some columns in a base column group may be orthogonal while some other columns offer refinement of the orthogonal columns. For example, if the base column group contains K=4 columns, the columns may be divided into two subgroups where the two columns in a subgroup are orthogonal to each other and the columns in the second subgroup is a slight perturbation of the columns in the first subgroup.

In contrast to the sliding window case, selecting the conversion precoder based on directly matching the conversion precoder to the channel correlation may not work well, for example, when the orthogonal columns span all dimensions. A possible refined approach is then to first perform channel correlation matching individually to each of the base columns that make up the base column groups and thereafter chose the conversion precoder which contains the base column that best matches the channel correlation. Note that for a block diagonal conversion precoder, usually a base column from each block is used to, together with column selection, to form new concatenated columns and such a concatenated column should be used in the matching with the channel correlation. Hence, when the overall precoder $W = W^{(c)} W^{(t)}$ is formed based on Equations (23) and (24), each column within each W for some fixed phase adjustment $\theta_q$, $q=1, 2, \ldots, Q$ may be individually matched with the channel correlation and then the conversion precoder $W^{(c)}$ is fixed to the one which corresponds to the column with the best match. This enables the conversion precoder to be selected on a wideband/long-term basis while the tuning precoder still has the possibility to perform coarse subspace steering by selecting between several columns of the conversion precoder.

A block diagonal conversion precoder with block adjustment involves allowing the different blocks in a block diagonal conversion precoder to be different. Thus, for the case of two blocks (and more blocks follow in a similar manner):

$$W_{l,l'}^{(c)} = \begin{bmatrix} X_l & 0 \\ 0 & X_{l'} \end{bmatrix} \quad (33)$$

This may be beneficial particularly for transmission rank three and higher where more than one column per block must be selected to utilize also the co-polarized antennas to create unique spatial signatures for the different layers since polarization alone may support a maximum of two layers. The channel correlation within the antennas corresponding to one block is likely to at most be moderate when higher transmission ranks are employed and therefore it cannot be taken for granted that the blocks should have identical precoders. Sliding window approaches as well as orthogonal precoder column techniques as described above, or combinations thereof, can be used. Selection of conversion precoder can also be performed according to any of the described techniques. The blocks may be different because they contain different base columns or the blocks may be a function of one of the blocks in addition to a perturbation factor. For example in the latter case, $X_{l'}=g_p(X_l)$, where the indices p and l together correspond to a certain l' and where the matrix-valued function $g_p(\cdot)$ can take several different forms including corresponding to introducing a perturbation of $X_l$ via $X_{l'}=X_l\Lambda_p$ or $X_{l'}=\Lambda_p X_l$ where $\Lambda_p$ is a diagonal matrix with elements of type $e^{j\phi}$ taken from some PSK constellation.

In some embodiments, it may be beneficial if the number of base columns generating the conversion precoder can be adapted dynamically. Roughly speaking, this depends on the relative strengths of the eigen-directions given by the channel correlation matrix. If the correlation is high, the transmitted signals should be confined to a small subspace and hence it should be acceptable to perform aggressive dimension reduction using few (or even a single) base columns (typically leading to few columns in the conversion precoder as well) and little or no column selection via the tuning precoder. Conversely, if the correlation is low, the signaling subspace should be larger and hence the number of base columns should grow. Low channel correlation may also mean that the channel realizations may need to be tracked in a frequency-selective/time-varying manner and thus performance may benefit from letting the tuning precoder select from several columns.

The precoder for high correlation scenarios could be chosen to correspond to the block diagonal structure in Equation (4), or alternatively to a refinement approach using a sliding window as discussed above with respect to Equations 20-25, while low correlation scenarios could be handled by a design using orthogonal precoder columns as discussed above with respect to Equations 30-32. Another option for the low correlation scenario is to let the conversion precoder be a fixed $N_T \times N_T$ matrix (e.g., the identity, DFT, Hadamard or a block diagonal matrix) and then let the tuning precoder operate on all of the channel dimensions. A tall fixed matrix is also possible from which the tuning precoder would select and adjust columns.

Channel correlation conditions may vary over time as UE 200 moves in the environment. To account for this variation of channel correlation conditions, UE 200 would need to automatically determine the number of base columns that form the conversion precoder. This also affects the signaling overhead for the tuning precoder so that the choice of conversion precoder in UE 200 can be said to determine the feedback transmission format of the tuning precoder. Computational complexity avoiding a pure exhaustive search is another potentially significant aspect to keep in mind.

Determining the number of base columns can be achieved by exploiting the capacity based criterion in Equation (28) to select between conversion precoders corresponding to different numbers of base columns, i.e., selecting the conversion precoder (regardless of number of base columns) that increases the capacity based criterion function. The number of base columns would thereafter be fixed and the UE can proceed to select the tuning precoder and the transmission rank of the overall precoder.

Another alternative is to use either of correlation matching or capacity based criterions to select a candidate conversion precoder for each possible number of base columns and then perform an exhaustive search for tuning precoder and transmission rank in conjunction with finding the optimal number of base columns by exploiting the candidate precoders (one per number of base columns). The complexity of the UE may still be manageable since the selection of candidate conversion precoders may substantially reduce the search space of the exhaustive search.

A refined House Holder Based Conversion Precoder may be used according to some embodiments. In these embodiments, DFT based columns act as "anchor" columns taking care of the main correlation direction of the channel and the DFT base columns are included in the columns of the conversion precoder together with non-DFT based columns which act as perturbations relative the anchor column, which may be considered a sort of differential precoding relative the anchor column. The perturbations could involve taking the anchor columns and creating new columns by slightly adjusting the phases, albeit not with linearly increasing phase across the antennas as for DFT based columns.

Another way to select columns "around" the anchor column is to select columns from a larger set of base columns to reduce and/or minimize a maximum distance between the selected precoders. Suitable distance metrics include Chordal distance, Fubini-Study distance, and project two-norm distance, in addition to any other subspace distance metrics on the Grassmanian manifold. Such a min-max design may target scenarios with high correlation but not complete correlation. At the other end of the scale are design criteria selecting columns to accompany the anchor column by increasing and/or maximizing minimum distances. This approach strives to span a more diverse set of eigen-directions of the channel and may be more suitable for uncorrelated channels while still making sure that accurate beamforming gain can be achieved via plenty of anchor columns.

The 16 House Holder based rank-1 precoders already available for the 4 Tx LTE Rel-8 codebook can be used to create a first set of base columns. The codebook already includes 8 DFT based columns. To increase the spatial resolution further, the first set of base columns can be extended by multiplying them with a diagonal matrix performing phase adjustment so as to increase the beam oversampling factor of the DFT based columns. If the beam oversampling factor is increased by a factor of $Q_u$, the total number of base columns is $16Q_u$. Each base column group now includes one of the DFT based columns (original DFT based column in the House Holder codebook or one of the ones obtained through increased beam oversampling). The other K−1 columns may be obtained by either a min-max or a max-min search among the remaining base columns or a subset thereof. Suitable search subsets include leaving out all other DFT based columns so that only the anchor column is DFT based. Alternatively, some of the closest (in a main lobe angle sense) DFT based columns could be excluded while other DFT based columns further away could be part of the search subset as well. Motivation for leaving out DFT based columns close to the anchor column may be that when the correlation is reduced the channel fading is anyway not obeying a DFT like structure.

According to some embodiments, a design may involve doubling the beam oversampling factor for DFT precoders to 4. There are then 32 different base columns out of which 16 are DFT based. Let each DFT based column be an anchor column, meaning that there are 16 different base column groups. Further let each base column group contain K=4 columns. The three non-anchor columns can be chosen in the described min-max or max-min manner from a search subset not containing any of the DFT based columns. The base column groups are used to form block-diagonal conversion precoders with two blocks as in Equation (23) so there are hence 16 different conversion precoders, and/or block adjustment may also be performed as an alternative. The tuning precoder selects among the four columns in each block similar to as in Equation (24) and also performs phase adjustment using four different phases from a 4-PSK alphabet.

According to some embodiments of the present invention, efficient precoding performance may be provided while maintaining a low signaling overhead and reasonable UE precoder selection complexity in a precoder setup where an overall precoder is formed from a product of two precoders. Signaling subspace refinement and coarse signaling subspace steering techniques may be exploited in a manner so as to achieve these goals. Techniques for performing dynamic adaptation of conversion precoder dimensions are also disclosed and may provide a benefit of being able to efficiently cope with different degrees of correlation in the channel.

Figure 7:
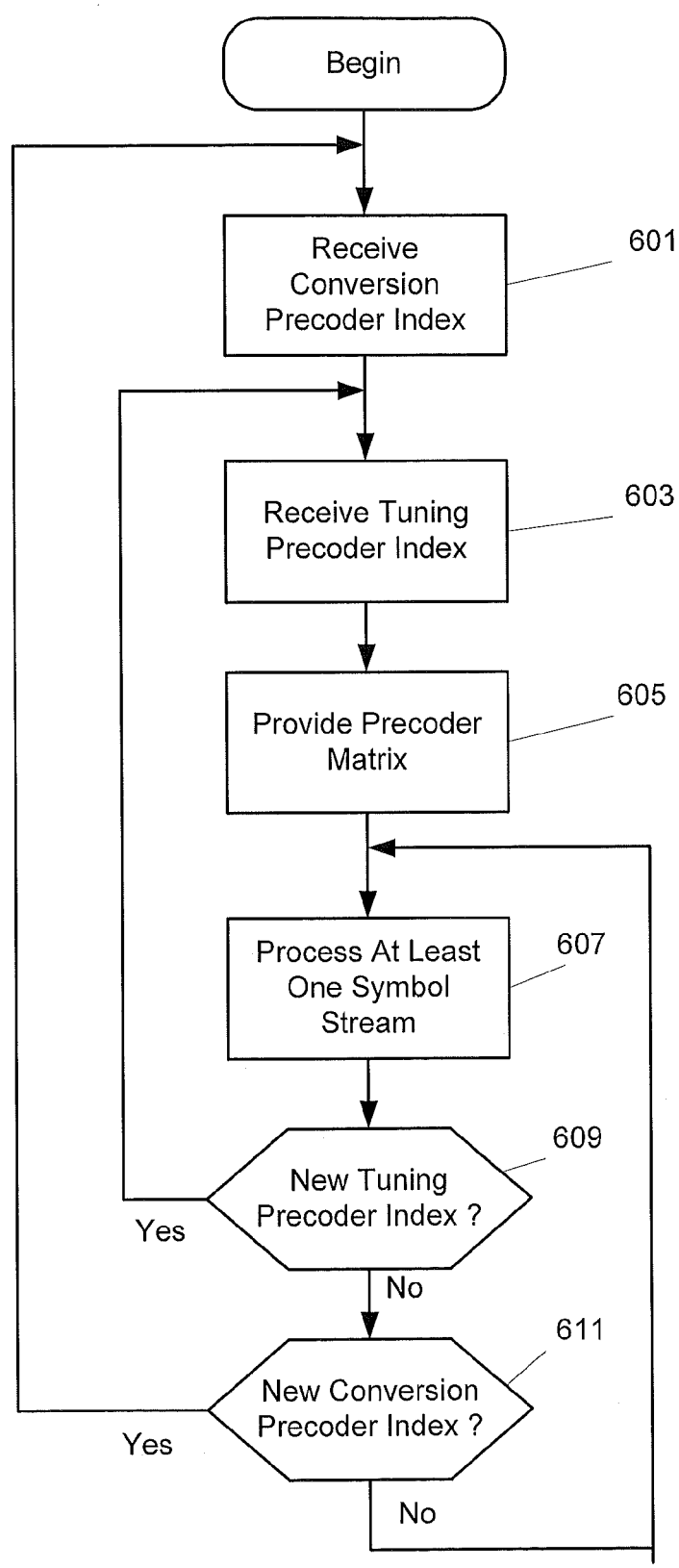
FIG. 7 is a flow chart illustrating operations of a UE of FIG. 2 according to some embodiments.

Operations of UE 200 (as shown in FIG. 2) will now be discussed in greater detail with respect to the flow chart of FIG. 7. As discussed above, UE 200 receives communications from base station 200 over wireless channel 300 through antenna 217 and transceiver 209. Responsive to the received communications, processor 201 measures initial characteristics of the wireless channel 300 at block 701. Responsive to measuring the initial characteristics of the wireless channel 300, processor 201 selects an initial conversion precoder index (also referred to as an initial first precoder index) and an initial tuning precoder index (also referred to as an initial second precoder index) at block 703. The selected conversion and tuning precoder indices are then transmitted through transceiver 209 and antenna 217 to base station 100 at block 705. After transmitting the selected initial conversion and tuning precoder indices, processor 201 is configured to process signals received from the antenna array 117 of base station 100 at block 707.

As discussed above, each of a plurality of conversion precoder indices may be used to identify a respective conversion precoder from a plurality of conversion precoders $W^{(c)}$, and each of a plurality of tuning precoder indices may be used to identify a respective tuning precoder from a plurality of tuning precoders $W^{(t)}$. While embodiments of conversion and tuning precoders are discussed by way of example, other conversion and tuning precoder structures may be used. Moreover, embodiments of the present invention use multiple different precoder indices to separately identify multiple factors of a transmitter precoder matrix. Accordingly, by appropriate design of the precoder codebook(s) used by the base station, a tuning precoder element/factor of the overall precoder may be updated relatively frequently to model frequently changing properties of channel 300 with relatively low signaling overhead, while a conversion precoder element/factor of the overall precoder may be updated relatively infrequently to model infrequently changing properties of channel 300.

Processor 201 may continue processing signals received from base station 100 at block 707 based on the initial tuning and conversion precoder indices until a new tuning precoder index and/or a new conversion precoder index is selected. More particularly, processor 201 may periodically remeasure characteristics of channel 300 while processing signals received from base station 100. Processor 201 may determine at block 711 if a new conversion precoder is needed, and processor 201 may determine at block 715 if a new tuning precoder is needed (without changing the existing conversion precoder). Provided that characteristics of channel 300 remain sufficiently unchanged as determined at blocks 711 and 715, processor 201 may continue processing received signals based on the same conversion and tuning precoders (defined by the most recently sent conversion and tuning precoder indices).

A conversion precoder index may thus be used to select a conversion precoder factor of base station 100 precoder 105 that varies relatively infrequently over time and thus requires relatively infrequent updating. In contrast, a tuning precoder index may be used to select a tuning precoder factor of base station 100 precoder 105 that varies relatively frequently over time and thus requires relatively frequent updating. Accordingly, processor 201 may repeatedly measure characteristics of channel 300 at block 709 without sending any new tuning and/or conversion precoder indices. If measured characteristics of channel 300 are not sufficiently changed at block 711 to initiate selection of a new conversion precoder index, processor 201 determines at block 715 if measured characteristics of channel 300 are sufficiently changed to select a new tuning precoder index at block 715. If so, the selected tuning precoder index is transmitted through transceiver 209 and antenna 217 to base station 100 at block 717, and processor 707 then processes signals received from base station 100 at block 707 based on the prior conversion precoder (identified by the last sent conversion precoder index) and based on the new tuning precoder (identified by the new tuning precoder index). Because tuning precoders correspond to channel properties that vary relatively frequently, processor 201 may select and transmit a number of new tuning precoder indices at blocks 715 and 717 without transmitting any new conversion precoder indices at blocks 711 and 712.

If processor 201 determines at block 711 that characteristics of channel 300 have changed sufficiently at block 711, new conversion and tuning precoder indices may be selected and transmitted to base station 100 at blocks 711 and 712. By appropriate design of conversion and tuning precoders (and codebook or respective codebooks) and respective indices, each conversion precoder (or conversion precoder factor) may be associated with a respective group of tuning precoders (or tuning precoder factors) so that each conversion precoder index is associated with a respective group of tuning precoder indices. Accordingly, once processor 201 selects a conversion precoder index, processor 201 need only select from the group of tuning precoder indices associated with the selected conversion precoder index.

Accordingly, the conversion precoder index may be one of a plurality of conversion precoder indices corresponding to a respective plurality of conversion precoder matrices or conversion precoder factors. The tuning precoder index may be one of a plurality of tuning precoder indices corresponding to a respective plurality of tuning precoder matrices. Moreover, a recommended precoder matrix comprises a product of a conversion precoder matrix or factor corresponding to the selected conversion precoder index and a tuning precoder matrix or factor corresponding to the selected tuning precoder matrix.

Each of the plurality of conversion precoder matrices may correspond to a respective group of the transmission beams B0-B15 of the grid shown in FIG. 3, and each group of the transmission beams of the grid may include a same number of the transmission beams (e.g., 4 transmission beams). Moreover, each of the plurality of conversion precoder matrices may include respective lines of elements corresponding to the transmission beams of the respective group.

According to some embodiments, each grouping of transmission beams corresponding to a respective conversion precoder may include at least two adjacent transmission beams, and according to some embodiments, some of the groups may include at least four adjacent transmission beams (referred to above as a sliding window). In addition, at least one group of transmission beams may include a first transmission beam at a first edge of the grid and a second transmission beam at a second edge of the grid so that the first and second transmission beams have a greatest angular separation of any of the transmission beams of the grid (referred to above as wrapping). Moreover, a first group of transmission beams corresponding to a first conversion precoder may be between and overlapping second and third groups of transmission beams so that a same number of transmission beams is shared between the first and second groups and between the first and third groups.

As discussed above with respect to FIG. 3, for example, the beams may be grouped as follows: B0-B3; B1-B4; B2-B5; B3-B6; B4-B7; B5-B8, B6-B9; B7-B10; B8-B11; B9-B12; B10-B13; B11-B14; B12-B15; B13-B15 and B0; B14-15 and B0-B1; and B15 and B0-B2. Each group of beams includes the same number of beams, and most of the groups include adjacent beams. Moreover, a first group of beams (e.g., beams B10-B13) is between and overlapping second and third groups of beams (e.g., beams B9-B12 and beams B11-B14). In addition, beam groups at edges of the grid (e.g., beams B13-B15 and B0; B14-15 and B0-B1; and B15 and B0-B2) may include non-adjacent beams from the grid having the greatest angular separation (e.g., beams B0 and B15).

According to some other embodiments, each group of transmission beams corresponding to a respective conversion precoder may include only orthogonal transmission beams. As discussed above with respect to FIG. 3, for example, the beams may be grouped as follows: B0, B4, B8, and B12; B1, B5, B9, and B13; B2, B6, B10, and B14; and B3, B7, B11, and B15.

Figure 8:
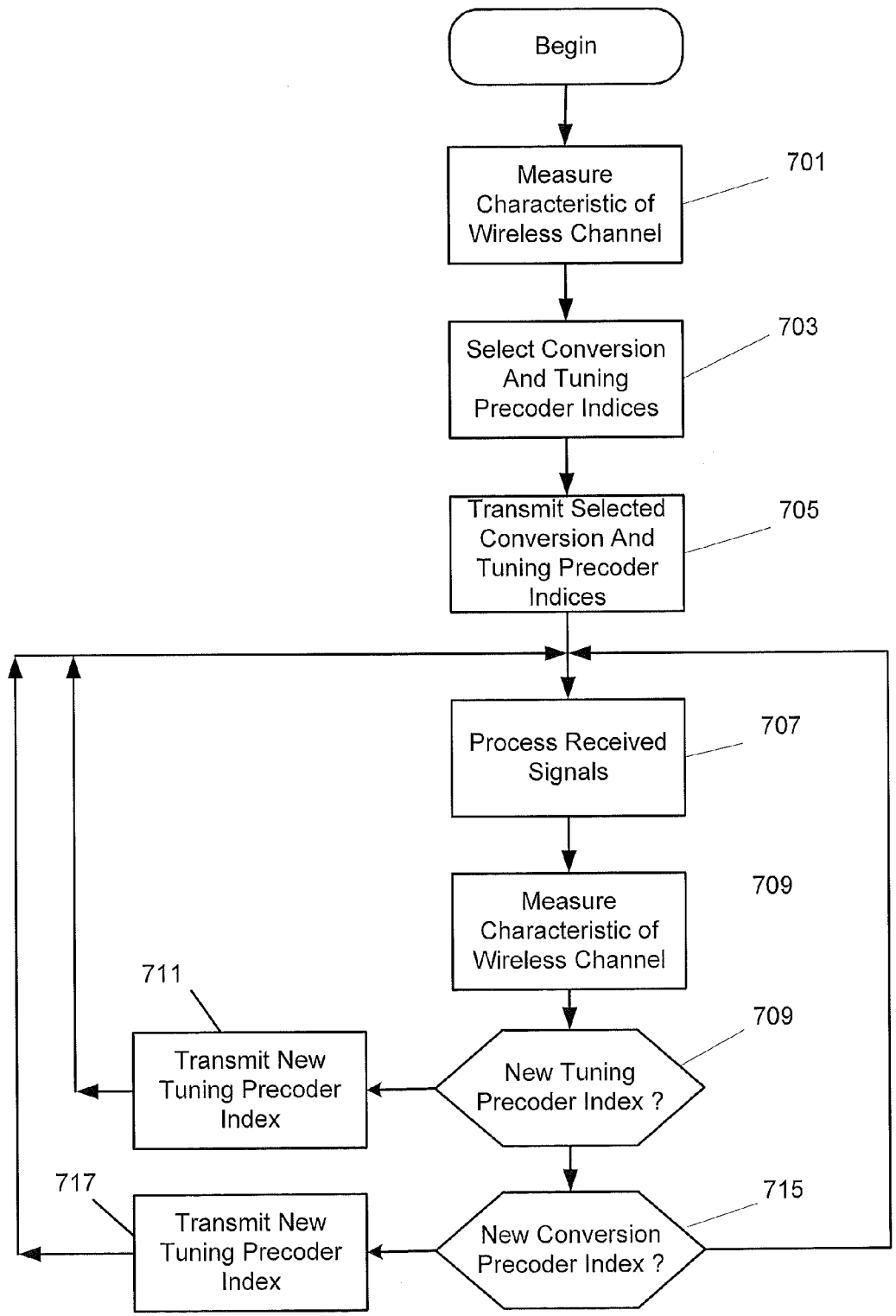
FIG. 8 is a flow chart illustrating operations of a base station of FIG. 2 according to some embodiments.

Operations of base station 100 (as shown in FIGS. 2 and 4-6) will now be discussed in greater detail with respect to the flow chart of FIG. 8. When communicating with UE 200, base station 100 receives uplink communications over channel 300 through antenna array 117 and transceiver 109 at processor 101, and as discussed above with respect to FIG. 8, UE 200 transmits conversion and/or tuning precoder indices in these uplink communications. At block 601 and 603, processor 101 receives an initial conversion precoder index (also referred to as an initial first precoder index) and an initial tuning precoder index (also referred to as initial second precoder indices) when sent by UE 200. Responsive to receiving the initial conversion and tuning precoder indices, processor 101 provides a precoder matrix 105 at block 605. Processor 101 may then process at least one symbol stream using the provided precoder matrix 105 to generate respective antenna signals for respective antenna elements of the antenna array 117, and the antenna signals may be transmitted through the respective antenna elements to UE 200.

As long as no new conversion and/or tuning precoder indices are received from UE 200 at blocks 609 and 611, processor 101 may continue processing the symbol stream(s) using precoder matrix 105 selected based on the initial conversion and tuning precoder indices at block 607 and transmitting the resulting antenna signals at block 608. If a subsequent tuning precoder index is provided by UE 200 (but no subsequent conversion precoder index is received), processor 101 receives the subsequent tuning precoder index at blocks 611 and 603, and provides a new precoder matrix 105 based on the initial conversion precoder index and the subsequent tuning precoder index at block 605. Accordingly, a plurality of updated tuning precoder indices may be received without updating the conversion precoder index, and different precoder matrices may be provided at block 605 based the same conversion precoder index and different tuning precoder indices. The new precoder matrix/matrices may then be used to process the symbol stream(s) at block 607 for transmission to UE at block 608.

If a subsequent conversion precoder index is provided by UE 200, processor 101 receives the subsequent conversion precoder index at blocks 609 and 601. Moreover, because a respective group of tuning precoder indices may be associated with each conversion precoder index, a subsequent tuning precoder index may be received at block 603 any time a new conversion precoder index is received. Accordingly, processor 101 may provide a new precoder matrix at block 605 based on the net conversion and tuning precoder indices. The new precoder matrix may then be used to process the symbol stream(s) at block 607 for transmission to UE at block 608.

As shown in FIG. 4, processor 101 may provide precoder 105 as a single matrix selected from a single precoder codebook 119. The single matrix may comprise a product of conversion precoder and tuning precoder factors, and precoders may be arranged in codebook 119 so that the conversion precoder and tuning precoder factors may be separately indexed/identified using the conversion precoder and tuning precoder indices. Codebook 119, for example, may be organized so that precoder matrices having the same conversion precoder factor are arranged in the same row and so that precoder matrices having the same tuning precoder factor are arranged in the same column, or vice versa. Accordingly, the conversion precoder index may be used to select a codebook row, and the tuning precoder index may be used to select a column.

As shown in FIG. 5, processor 101 may provide precoder 105 as separate conversion and tuning precoders 105a and 105b selected from respective conversion and tuning precoder codebooks 119a and 119b. Accordingly, conversion and tuning precoder indices may be used to select from separate codebooks. As shown in FIG. 6, tuning precoder 105 may be provided as separate selection and adjustment precoders 105b1 and 105b2 selected form respective selection and adjustment precoder codebooks 119b1 and 119b2. Accordingly, tuning precoder indices may be provided in two parts (e.g., selection and adjustment precoder indices) so that three indices (e.g., conversion, selection, and adjustment indices) may be used to identify separate precoder elements (e.g., conversion, selection, and adjustment precoder elements) of overall precoder 105.

The conversion precoder index may be one of a plurality of conversion precoder indices corresponding to a respective plurality of conversion precoder matrices, and the tuning precoder index may be one of a plurality of tuning precoder matrices corresponding to a respective plurality of tuning precoder matrices. Moreover, the provided precoder matrix may comprise a product of a conversion precoder matrix corresponding to the received conversion precoder index and a tuning precoder matrix corresponding to the received tuning precoder matrix. Moreover, each of the plurality of conversion precoder matrices may correspond to a respective group of the transmission beams (B0-B15) of the grid with each group of the transmission beams of the grid including a same number of the transmission beams. Moreover, each of the plurality of conversion precoder matrices may include respective lines of elements corresponding to the transmission beams of the respective group.

According to some embodiments, each group of transmission beams may include at least two adjacent transmission beams. For example, at least one group of transmission beams may include a first transmission beam B0 at a first edge of the grid and a second transmission beam B15 at a second edge of the grid so that the first and second transmission beams (e.g., beams B0 and B15) have a greatest angular separation of any of the transmission beams of the grid. Moreover, a first group of transmission beams may be between and overlapping second and third groups of transmission beams so that a same number of transmission beams is shared between the first and second groups and between the first and third groups. According to some other embodiments, each group of transmission beams may include only orthogonal transmission beams.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of transmitting data from a first communications device using multiple antennas to a second communications device based on precoder feedback defining a grid of transmission beams, the method comprising:
receiving a first precoder index from the second communications device;
receiving an initial second precoder index from the second communications device;
processing a first portion of at least one symbol stream based at least in part on the first precoder index and the initial second precoder index to generate respective first antenna signals for respective antenna elements of the multiple antennas;
transmitting the first antenna signals over the multiple antennas to the second communications device;
receiving a subsequent second precoder index from the second communications device; and
processing a second portion of the at least one symbol stream based at least in part on the first precoder index and the subsequent second precoder index to generate respective second antenna signals for respective antenna elements of the multiple antennas.

2. A method according to claim 1 wherein the first precoder index comprises a conversion precoder index that is one of a plurality of conversion precoder indices corresponding to a respective plurality of conversion precoder matrices, wherein the second precoder index comprises a tuning precoder index that is one of a plurality of tuning precoder indices corresponding to a respective plurality of tuning precoder matrices, and wherein processing comprises processing the at least one symbol stream using an overall precoder matrix comprising a product of a conversion precoder matrix corresponding to the received conversion precoder index and a tuning precoder matrix corresponding to the received tuning precoder index.

3. A method according to claim 2 wherein each of the plurality of conversion precoder matrices corresponds to a respective group of the transmission beams of the grid, wherein each group of the transmission beams of the grid includes a same number of the transmission beams, and wherein each of the plurality of conversion precoder matrices includes respective lines of elements corresponding to the transmission beams of the respective group.

4. A method according to claim 3 wherein each group of transmission beams includes at least two adjacent transmission beams.

5. A method according to claim 4 wherein at least one group of transmission beams includes a first transmission beam at a first edge of the grid and a second transmission beam at a second edge of the grid.

6. A method according to claim 4 wherein first, second, and third ones of the conversion precoder matrices respectively correspond to first, second, and third ones of the groups of transmission beams, and wherein the second group of transmission beams is between and overlapping the first and third groups of transmission beams so that a same number of transmission beams is shared between the first and second groups and between the second and third groups.

7. A method according to claim 3 wherein each group of transmission beams includes only orthogonal transmission beams.

8. A method according to claim 3 wherein the multiple antennas includes 8 antenna elements and wherein the grid of transmission beams includes 16 beams.

9. A method of selecting precoder characteristics for a wireless channel over which communications are received from a communications device using multiple antennas which together with a precoder codebook defines a grid of transmission beams, the method comprising;
at a first time or frequency, measuring characteristics of the wireless channel over which the communications are received from the communications device;
responsive to measuring the characteristics of the wireless channel at the first time or frequency, selecting a first precoder index;
responsive to measuring the characteristic of the wireless channel, selecting an initial second precoder index;
transmitting the first precoder index and the initial second precoder index to the communications device;
measuring a characteristic of the wireless channel at a second time or frequency different than the first time or frequency;
responsive to measuring the characteristic of the wireless channel at the second time or frequency, selecting a subsequent second precoder index different than the initial second precoder index; and
transmitting the subsequent second precoder index to the communications device.

10. A method according to claim 9 wherein the first precoder index comprises a conversion precoder index that is one of a plurality of conversion precoder indices corresponding to a respective plurality of conversion precoder matrices, wherein the second precoder index comprises a tuning precoder index that is one of a plurality of tuning precoder indices corresponding to a respective plurality of tuning precoder matrices, and wherein an overall precoder matrix comprises a product of a conversion precoder matrix corresponding to the selected conversion precoder index and a tuning precoder matrix corresponding to the selected tuning precoder index.

11. A method according to claim 10 wherein each of the plurality of conversion precoder matrices corresponds to a respective group of the transmission beams of the grid, wherein each group of the transmission beams of the grid includes a same number of the transmission beams, and wherein each of the plurality of conversion precoder matrices includes respective lines of elements corresponding to the transmission beams of the respective group.

12. A method according to claim 11 wherein each group of transmission beams includes at least two adjacent transmission beams.

13. A method according to claim 12 wherein at least one group of transmission beams includes a first transmission beam at a first edge of the grid and a second transmission beam at a second edge of the grid.

14. A method according to claim 12 wherein first, second, and third ones of the conversion precoder matrices respectively correspond to first, second, and third ones of the groups of transmission beams, and wherein the second group of transmission beams is between and overlapping the first and third groups of transmission beams so that a same number of transmission beams is shared between the first and second groups and between the second and third groups.

15. A method according to claim 11 wherein each group of transmission beams includes only orthogonal transmission beams.

16. A first communications device comprising:
multiple antennas providing a grid of transmission beams based on precoder feedback;
a receiver coupled to the multiple antennas wherein the receiver is configured to receive a first precoder index, an initial second precoder index, and a subsequent second precoder index from a second communications device;
a processor coupled to the multiple antennas and to the receiver, wherein the processor is configured to process a first portion of at least one symbol stream based at least in part on the first precoder index and the initial second precoder index to generate first antenna signals for respective antenna elements of the multiple antennas, and to process a second portion of the at least one symbol stream based at least in part on the first precoder index and the subsequent second precoder index to generate second antenna signals for respective antenna elements of the multiple antennas; and
a transmitter coupled to the processor wherein the transmitter is configured to transmit the first antenna signals through the respective antenna elements of the multiple antennas to the second communications device, and to transmit the second antenna signals over the respective antenna elements of the multiple antennas.

17. A first communications device according to claim 16 wherein the first precoder index comprises a conversion precoder index that is one of a plurality of conversion precoder indices corresponding to a respective plurality of conversion precoder matrices, wherein the second precoder index comprises a tuning precoder index that is one of a plurality of tuning precoder indices corresponding to a respective plurality of tuning precoder matrices, and wherein the processor is configured to process the at least one symbol stream using an overall precoder matrix comprising a product of a conversion precoder matrix corresponding to the received conversion precoder index and a tuning precoder matrix corresponding to the received tuning precoder index.

18. A first communications device according to claim 17 wherein each of the plurality of conversion precoder matrices corresponds to a respective group of the transmission beams of the grid, wherein each group of the transmission beams of the grid includes a same number of the transmission beams, wherein each of the plurality of conversion precoder matrices includes respective lines of elements corresponding to the transmission beams of the respective group, wherein each group of transmission beams includes at least two adjacent transmission beams, and wherein at least one group of transmission beams includes a first transmission beam at a first edge of the grid and a second transmission beam at a second edge of the grid.

19. A first communications device according to claim 17 wherein each of the plurality of conversion precoder matrices corresponds to a respective group of the transmission beams of the grid, wherein each group of the transmission beams of the grid includes a same number of the transmission beams, wherein each of the plurality of conversion precoder matrices includes respective lines of elements corresponding to the transmission beams of the respective group, wherein each group of transmission beams includes at least two adjacent transmission beams, wherein first, second, and third ones of the conversion precoder matrices respectively correspond to first, second, and third ones of the groups of transmission beams, and wherein the second group of transmission beams is between and overlapping the first and third groups of transmission beams so that a same number of transmission beams is shared between the first and second groups and between the second and third groups.

20. A method according to claim 17 wherein each of the plurality of conversion precoder matrices corresponds to a respective group of the transmission beams of the grid, wherein each group of the transmission beams of the grid includes a same number of the transmission beams, and wherein each of the plurality of conversion precoder matrices includes respective lines of elements corresponding to the transmission beams of the respective group.

21. A first communications device comprising:
a transceiver configured to provide wireless communications with a second communications device through an antenna and over a wireless channel, wherein the second communications device uses multiple antennas; and
a processor coupled to the transceiver wherein the processor is configured to measure, at a first time or frequency, characteristics of the wireless channel over which the wireless communications are received from the second communications device, to select a first precoder index and an initial second precoder index responsive to measuring the characteristics of the wireless channel at the first time or frequency, to transmit the first precoder index and the initial second precoder index to the second communications device through the transceiver and the antenna, and to process signals received from the multiple antennas of the second communications device based on the first precoder index and the initial second precoder index, and wherein the processor is further configured to measure a characteristic of the wireless channel at a second time or frequency different than the first time or frequency, to select a subsequent second precoder index different than the initial second precoder index responsive to measuring the characteristic of the wireless channel at the second time or frequency, to transmit the subsequent second precoder index to the second communications device, and to process signals received from the multiple antennas based on the first precoder index and the subsequent second precoder index.

22. A first communications device according to claim 21 wherein the first precoder index comprises a conversion precoder index that is one of a plurality of conversion precoder indices corresponding to a respective plurality of conversion precoder matrices, wherein the second precoder index comprises a tuning precoder index that is one of a plurality of tuning precoder indices corresponding to a respective plurality of tuning precoder matrices, and wherein an overall precoder matrix comprises a product of a conversion precoder matrix corresponding to the selected conversion precoder index and a tuning precoder matrix corresponding to the selected tuning precoder index.

23. A first communications device according to claim 22 wherein each of the plurality of conversion precoder matrices corresponds to a respective group of the transmission beams of the grid, wherein each group of the transmission beams of the grid includes a same number of the transmission beams, wherein each of the plurality of conversion precoder matrices includes respective lines of elements corresponding to the transmission beams of the respective group, wherein each group of transmission beams includes at least two adjacent transmission beams, and wherein at least one group of transmission beams includes a first transmission beam at a first edge of the grid and a second transmission beam at a second edge of the grid.

24. A first communications device according to claim 22 wherein each of the plurality of conversion precoder matrices corresponds to a respective group of the transmission beams of the grid, wherein each group of the transmission beams of the grid includes a same number of the transmission beams, wherein each of the plurality of conversion precoder matrices includes respective lines of elements corresponding to the transmission beams of the respective group, wherein each group of transmission beams includes at least two adjacent transmission beams, wherein first, second, and third ones of the conversion precoder matrices respectively correspond to first, second, and third ones of the groups of transmission beams, and wherein the second group of transmission beams is between and overlapping the first and third groups of transmission beams so that a same number of transmission beams is shared between the first and second groups and between the second and third groups.

25. A method according to claim 22 wherein each of the plurality of conversion precoder matrices corresponds to a respective group of the transmission beams of the grid, wherein each group of the transmission beams of the grid includes a same number of the transmission beams, and wherein each of the plurality of conversion precoder matrices includes respective lines of elements corresponding to the transmission beams of the respective group.

\* \* \* \* \*

UNITED STATES PATENT AND TRADEMARK OFFICE
CERTIFICATE OF CORRECTION

| | |
|---|---|
| PATENT NO. | : 8,494,033 B2 |
| APPLICATION NO. | : 12/973096 |
| DATED | : July 23, 2013 |
| INVENTOR(S) | : Jongren et al. |

It is certified that error appears in the above-identified patent and that said Letters Patent is hereby corrected as shown below:

In the Specification

In Column 5, Line 13, delete "an a" and insert -- a --, therefor.

In Column 7, Line 23, delete "Transceiver 115" and insert -- Transceiver 109 --, therefor.

In Column 10, Line 19, delete "CQi" and insert -- CQI --, therefor.

In Column 10, Lines 19-20, delete "codebook 118" and insert -- codebook 119 --, therefor.

In Column 10, Line 67, delete " $W_{N \times r}$ " and insert -- $W_{N_T \times r}$ --, therefor.

In Column 12, Line 47, delete "matrix" and insert -- matrix: --, therefor.

In Column 19, Lines 24-25, in Equation (28), delete $$\log \det\left(I + \frac{(W^{(c)})^* E[H^* H] W_i^{(c)}}{\sigma^2}\right)$$

" and insert --

$$\log \det\left(I + \frac{(W^{(c)})^* E[H^* H] W^{(c)}}{\sigma^2}\right)$$

--, therefor.

In the Claims

In Column 30, Line 15, in Claim 9, delete "comprising;" and insert -- comprising: --, therefor.

In Column 32, Line 6, in Claim 20, delete "method" and insert -- first communications device --, therefor.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,494,033 B2

In Column 33, Line 21, in Claim 25, delete "method" and insert -- first communications device --, therefor.